(12) United States Patent
Varanasi et al.

(10) Patent No.: US 7,873,908 B1
(45) Date of Patent: Jan. 18, 2011

(54) METHOD AND APPARATUS FOR GENERATING CONSISTENT USER INTERFACES

(75) Inventors: Sankara Sastry Varanasi, Sunnyvale, CA (US); Sandeep Saksena, San Jose, CA (US); Prakash Bettadapur, San Jose, CA (US); Jung Tjong, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1216 days.

(21) Appl. No.: 10/676,718

(22) Filed: Sep. 30, 2003

(51) Int. Cl.
*G06F 3/048* (2006.01)
*G06F 3/00* (2006.01)

(52) U.S. Cl. ............... 715/763; 715/744; 715/764; 715/765; 715/788; 715/825

(58) Field of Classification Search ............... 715/763, 715/764, 788, 744, 825, 765
See application file for complete search history.

(56) References Cited

U.S. PATENT DOCUMENTS

| | | | |
|---|---|---|---|
| 6,275,225 B1 * | 8/2001 | Rangarajan et al. | 715/700 |
| 6,523,027 B1 * | 2/2003 | Underwood | 707/4 |
| 6,684,369 B1 * | 1/2004 | Bernardo et al. | 715/513 |
| 6,697,825 B1 * | 2/2004 | Underwood et al. | 715/530 |
| 6,823,522 B1 * | 11/2004 | Lamb | 719/316 |
| 6,867,789 B1 * | 3/2005 | Allen et al. | 715/744 |
| 6,934,356 B1 * | 8/2005 | Satheesan et al. | 378/62 |
| 7,047,318 B1 * | 5/2006 | Svedloff | 709/246 |
| 2003/0046401 A1 * | 3/2003 | Abbott et al. | 709/228 |
| 2003/0058277 A1 * | 3/2003 | Bowman-Amuah | 345/765 |
| 2003/0125966 A1 * | 7/2003 | Viswanath et al. | 705/1 |
| 2004/0187090 A1 * | 9/2004 | Meacham | 717/103 |
| 2004/0205550 A1 * | 10/2004 | Gerken | 715/513 |

OTHER PUBLICATIONS

The Apache Software Foundation, "The Struts User's Guide—Table of Contents," http://jakarta.apache.org/struts/userGuide/index.html, data retrieved Apr. 28, 2004, pp. 1-3.
Cisco Systems, Inc., "EMBU UE Framework Initiatives," http://picasso/UE/index.cfm?secID=7&subSecID=121, data retrieved Apr. 28, 2004, 5 pages.
Cisco Systems, Inc., "SDK Developer's Guide for UI Infrastructure, Intermediate Release 4.0," Feb. 2002, 282 pages.

* cited by examiner

*Primary Examiner*—Weilun Lo
*Assistant Examiner*—Nicholas Augustine
(74) *Attorney, Agent, or Firm*—Hickman Palermo Truong & Becker LLP

(57) ABSTRACT

A method is disclosed for generating a consistent user interface for an HTML-based application program, without extensive coding of Java Server Pages and other elements. In one approach, business objects each define a user action for the application program, and metadata elements defining parameters for the user actions of the business object. A controller is communicatively coupled to one or more actions, widgets, and panels. A user request is received from a browser and dispatched to one or the actions. Using the actions, one or more parameter values are obtained from the business objects. The business object parameter values are associated with a widget selected from among the one or more widgets. The selected widget is associated with a panel selected from the one or more panels. An HTML user interface page that includes the selected panel is generated. The widgets represent properties of the business objects as HTML elements, automatically generate client-side executable code for performing data validation, and convert values received in users requests into programmatic objects of appropriate data types for use by the application program.

40 Claims, 15 Drawing Sheets

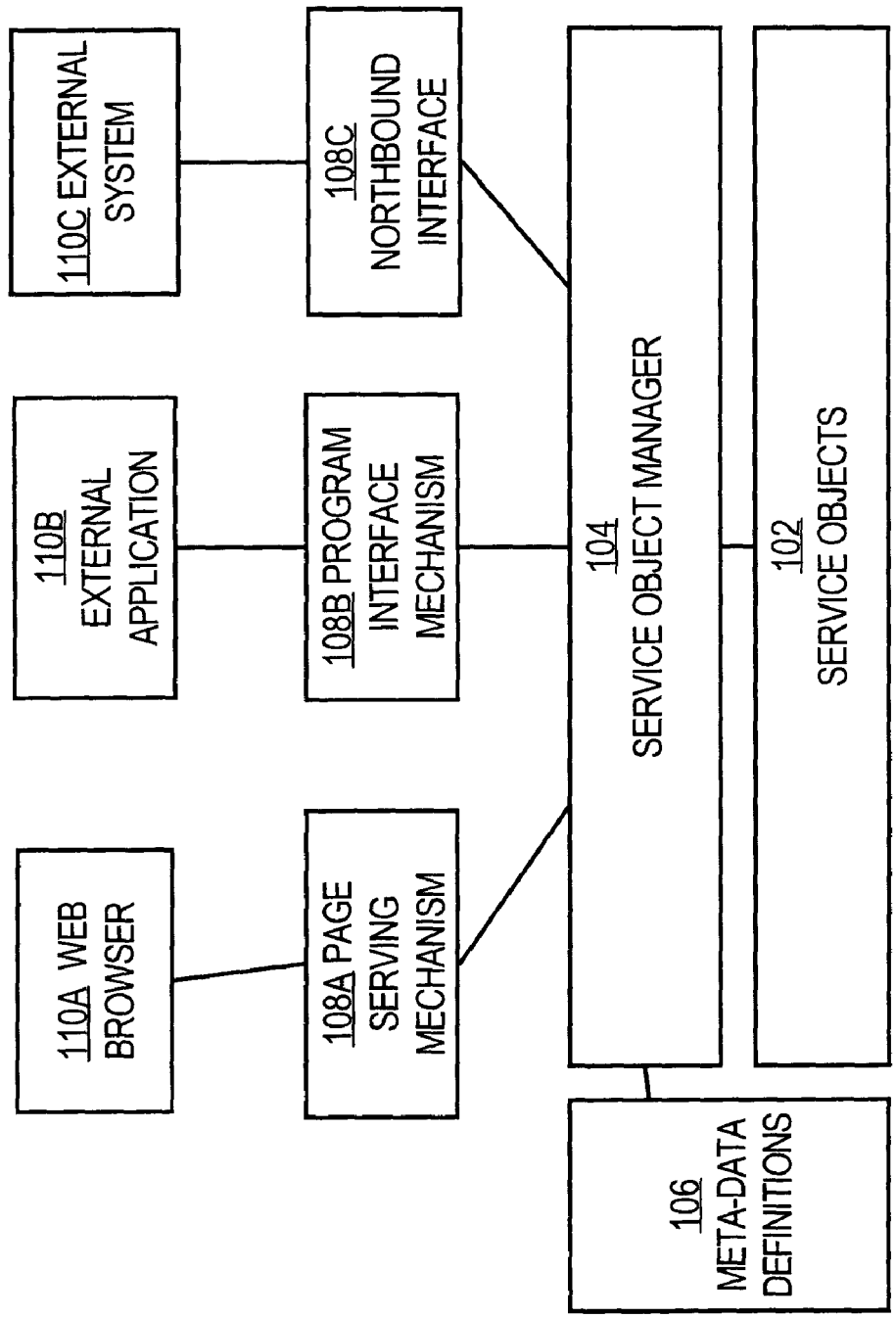

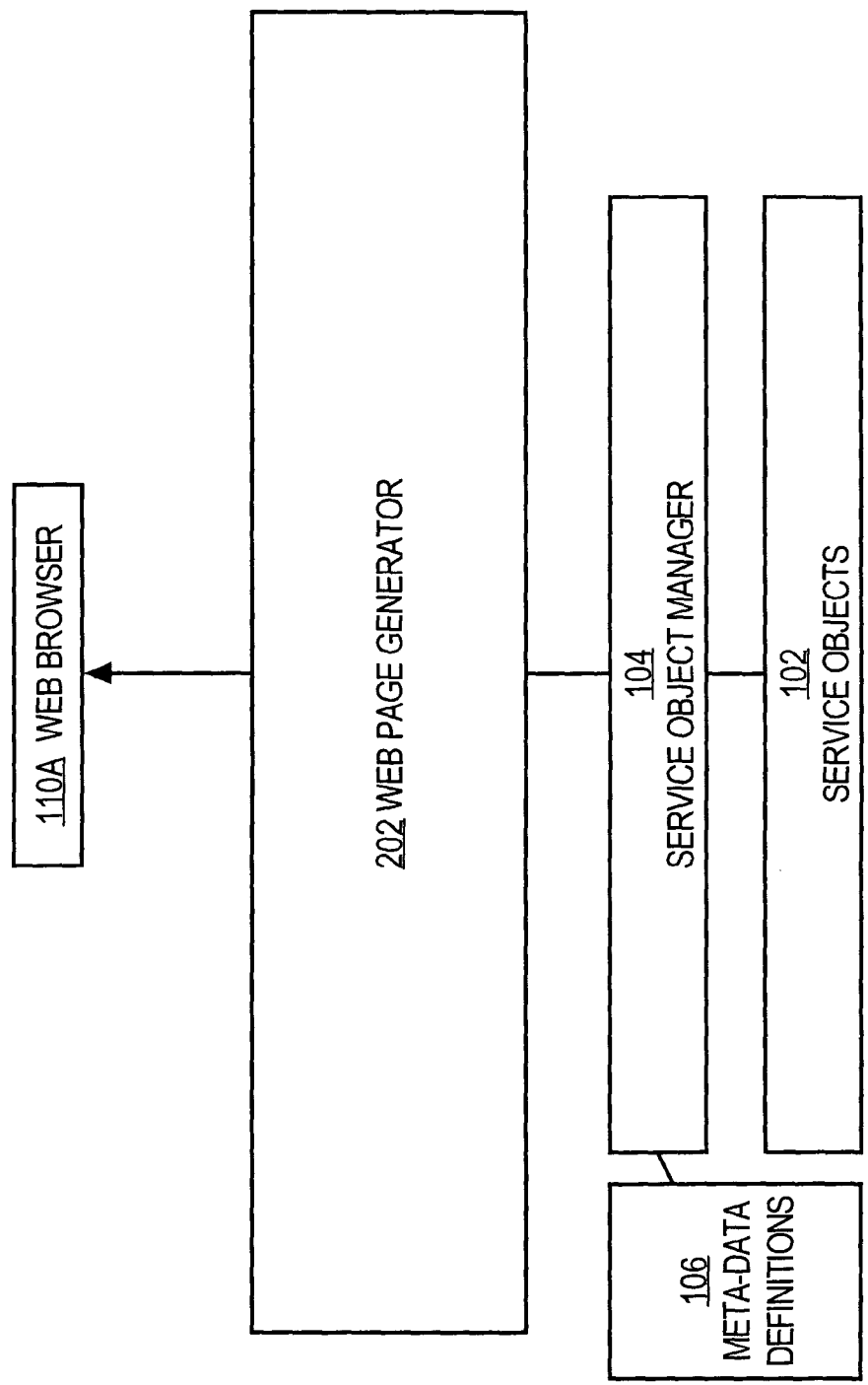

METHOD AND APPARATUS FOR GENERATING CONSISTENT USER INTERFACES

FIELD OF THE INVENTION

The present invention generally relates to user interface aspects of computer systems. The invention relates more specifically to a method and apparatus for generating consistent user interfaces

COPYRIGHT NOTICE

A portion of the disclosure of this patent document contains material which is subject to copyright protection. The copyright owner has no objection to the facsimile reproduction of the patent disclosure, as it appears in the Patent & Trademark Office patent file or records, but otherwise reserves all copyright rights whatsoever. Copyright© 2003 Cisco Systems, Inc.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Developing a user interface for a Java®-based computer application for use by an HTML browser typically involves several tasks. In general, for each user operation that can be performed in the user interface, a JSP page is created to collect user data; JavaScript is created to perform client-side data validation, such as verifying that a valid date value is entered in a date field; and Java code in the form of servlets or action classes is written to process the user data. Programmers and software developers can use several existing tools to facilitate each of the above steps. For example, Macromedia Dream Weaver supports JSP page layout, design, and in developing JavaScript code. Tools such as Visual Café or Borland JBuilder are used for developing Java code.

However, certain complex computer applications, such as network management systems, may support hundreds of different user operations, which require development of several hundreds of JSP pages and Java classes. The large number of JSP pages and Java code linked with the JSP pages not only increases development time, but also poses a serious problem in managing consistent development of the application or software product. In HTML/JSP environments, there are no predefined layouts for arranging graphical user interface data entry elements ("widgets") such as text boxes, combo boxes, checkboxes, etc. Instead, components are arranged within an HTML page using the HTML <table> tag, and such arrangement has to be done manually. This is tedious and time-consuming.

Moreover, since the JSP pages are hand coded for every operation, various pages of the completed application may have an inconsistent look and feel. This problem is compounded when multiple applications interact to form a more complex system, such as an integrated network management product that provides configuration, fault monitoring, reporting, functions, etc. To address the problem with consistent look and feel, some developers follow JSP templates, and use the templates with tools such as Macromedia Dreamweaver. However, this approach does not provide dynamic content generation capabilities and it does not address the problem of having an excessive number of JSP pages.

Thus, typical JSP development involves using custom tags to perform UI related logic. These tags help in hiding the Java® code so that a JSP page looks more like an HTML page that can be constructed using tools such as Dreamweaver. This approach is considered to enhance readability and maintainability of JSP pages; however, the tags are processed by a JSP container object, and are not flexible enough to be manipulated programmatically, and thus are not very suitable for dynamic generation of a UI.

Further, in today's business environment, achieving minimum time-to-market for a software product, software quality, total software maintenance cost and consistency in the look and feel of applications are essential contributors to overall profitability and higher customer satisfaction. Based on the foregoing, there is a need for a mechanism designed to address these problems.

In a variation of the development approach described above, known as MVC or the Model, View, Controller approach, JSP is mainly used for presentation of information, and servlets are used for processing logic. The Apache Struts framework is based on MVC architecture, and also provides a controller servlet that processes HTTP requests from a browser, and invokes appropriate action classes or JSP pages. This approach helps separate processing logic into action classes, thereby making the code more readable and maintainable. Further, the Apache Struts framework provides a set of tag libraries that can be used in developing JSP pages. These tag libraries help in further separating the Java code from JSP pages. However, Apache Struts does not address the issue of the number of JSP pages required by an application for its user interface. Additionally, the Apache Struts approach requires the developer to resolve the task of maintaining a consistent look and feel.

To address the problem of consistency among various company applications, the Enterprise Management Business Unit (EMBU) of Cisco Systems, Inc., San Jose, Calif., has proposed a solution consisting of a set of user interface guidelines and an associated framework. The guidelines, internally known as Picasso, provide a standard for the navigation and for use of various user interface elements. The guidelines help in standardizing the navigation of a GUI, while enabling a developer to determine the specific content of the user interface. As a result, the user interface look and feel is likely to be inconsistent. The framework, termed the UII or User Interface Infrastructure, is based on Apache Struts but follows the Picasso guidelines. The UII framework automates the navigational flow of an application, and provides JSP tags to help develop the content area, but it does not help in reducing the number of JSP pages.

With Picasso, XML documents termed site map XML drive user navigation of application pages. For the content area of an application, Picasso provides tag libraries similar to what Struts already provides, but adds additional tags such as paging table, scrolling table, dialog box, date/time field, etc. However, the developer is required to use the tag libraries in JSP pages created by the developer, and the developer is required to connect the tag libraries with the back end program components using Action classes or Bean classes.

Using Picasso with UII, a developer performs the following steps to create a user interface for an application. First, the developer defines Struts XML files and sitemap XML files. Second, the developer manually creates JSP pages for the content areas of the application. Third, the developer defines a FormBean class, or the equivalent, to hold user interface data for each data entry field. Fourth, the developer creates an Action class for each operation on the HTML page. Fifth, the developer writes business logic to implement each user interface action. A key disadvantage of this approach is that each JSP page for the content areas is created manually.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates an overview of a service object management system;

FIG. 2A is a block diagram that illustrates an overview of a web page generator system;

DETAILED DESCRIPTION OF THE PREFERRED EMBODIMENT

Figure 2B:
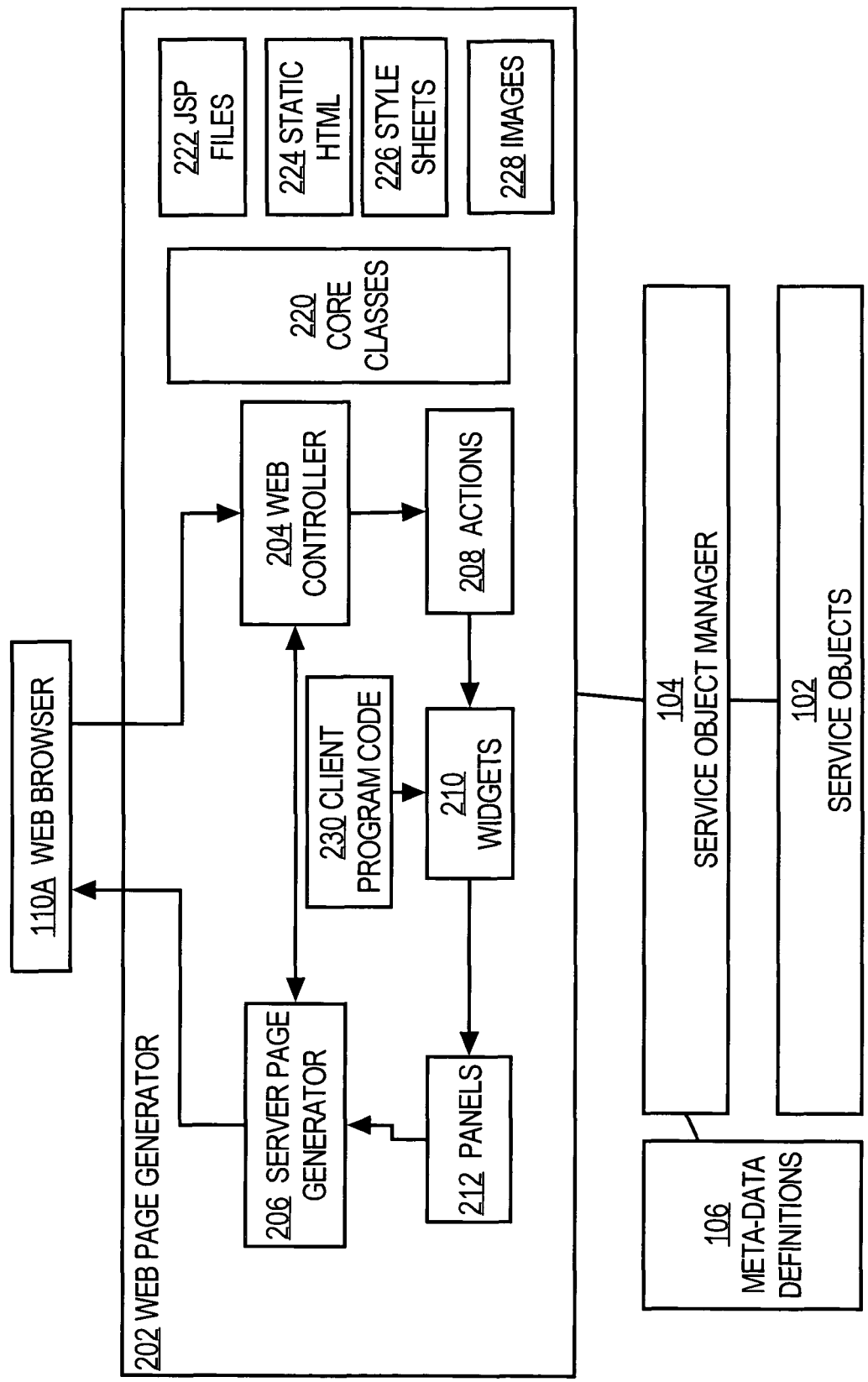
FIG. 2B is a block diagram that illustrates further details of the web page generator of FIG. 2A.

A method and apparatus for generating consistent user interfaces is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Example
    3.1 Struts Configuration
    3.2 Custom Tags
    3.3 Developing Content; Performing Client-Side Content Manipulation and Validation
    3.4 Metadata Definitions
    3.5 Process Flow during User Interactions
    3.6 Security Interfaces
4.0 Implementation Mechanisms - Hardware Overview
5.0 Extensions and Alternatives 1.0 General Overview The needs identified in the foregoing Background, and other needs and objects that will become apparent for the following description, are achieved in the present invention, which comprises, in one aspect, a method for generating a consistent user interface. For example, a method for generating a consistent user interface for an HTML-based application program, without extensive coding of Java Server Pages and other elements, is provided. Business objects each define a user action for the application program, and metadata elements defining parameters for the user actions of the business object. A controller is communicatively coupled to one or more actions, widgets, and panels. A user request is received from a browser and dispatched to one or the actions. Using the actions, one or more parameter values are obtained from the business objects. The business object parameter values are associated with a widget selected from among the one or more widgets. The selected widget is associated with a panel selected from the one or more panels. An HTML user interface page that includes the selected panel is generated. The widgets represent properties of the business objects as HTML elements, automatically generate client-side executable code for performing data validation, and convert values received in users requests into programmatic objects of appropriate data types for use by the application program.

In other aspects, the invention encompasses a computer apparatus and a computer-readable medium configured to carry out the foregoing steps.

2.0 Structural and Functional Overview

According to one embodiment, a mechanism and framework are provided for dynamically generating a web-based user interface for network management applications. In this embodiment, a system for generating consistent user interfaces comprises a mechanism based on business-level objects, each of which bundles several managed objects. The managed objects each consist of one or more parameters, which can be defined in metadata or constructed programmatically. The system further comprises a framework that can dynamically generate a web user interface for performing various user actions for a given service object in a consistent manner.

In one embodiment, the system provides dynamic content generation, dynamic content manipulation, dynamic layouts, and extensibility.

Dynamic content generation means that the system generates a web-based user interface dynamically based on the data supplied to it from the service objects. The service objects can be defined entirely in the metadata, so that a complete user interface is generated automatically by the system without writing program code to generate the user interface. Further, in a Java® embodiment, the system relieves a software developer from needing to know details of Java Server Pages (JSPs), servlets, and HTML when developing a web user interface (UI).

Dynamic content manipulation means that the system uses a widget-based approach, rather than using custom tags in JSPs. Each widget is a programmatic object that renders the user interface for parameters that are defined in a service object. Based on the service object parameters, a widget generates program code, e.g., JavaScript, to validate user inputs for a particular user interface element. Widgets further perform manipulation tasks such as setting access control values (e.g., enable or disable), setting default values, etc. Initialized widgets are arranged in a panel class depending on the nature of an HTTP user request received from a browser.

Dynamic layout means that the system introduces a way to arrange widgets in simple layouts or in complex layouts using groups, subgroups, and panels. Widgets can also be embedded into other complex widgets.

Extensibility means that the system includes an application programming interface (API) that enables a developer to add custom widgets, actions, or JSPs to the system.

FIG. 1 is a block diagram that illustrates an overview of a service object management system. One or more service objects 102 are created and stored, and are accessible to and managed by a service object manager 104, which can also receive and access metadata definitions 106. Service objects 102 may implement business-level operations or processes that require user input through a user interface. The metadata definitions 106 may define parameters that are received from a user through the user interface.

The service object manager 104 communicates data and instructions to other mechanisms that interface with external systems. For example, service object manager 104 communicates data and instructions to a page serving mechanism 108A that generates HTML user interface pages for display by a web browser 110A. In one embodiment, the page serving mechanism 108A is one or more JSP pages and servlets comprising the Picasso system, and metadata definitions 106 comprise eXtensible Markup Language (XML) definitions of parameters. Additionally or alternatively, service object manager 104 communicates data and instructions to a program interface mechanism 108B that interfaces to an external application 110B. For example, the program interface mechanism may comprise Enterprise JavaBeans, a remote method invocation mechanism, a Common Object Request Broker Architecture (CORBA) interface, etc. Application 110B may comprise a Java® GUI application or other applications. Additionally or alternatively, service object manager 104 communicates data and instructions to a northbound interface 108C that interfaces to an external system 110C, such as an operational support system (OSS) of a network service provider.

Figure 12:
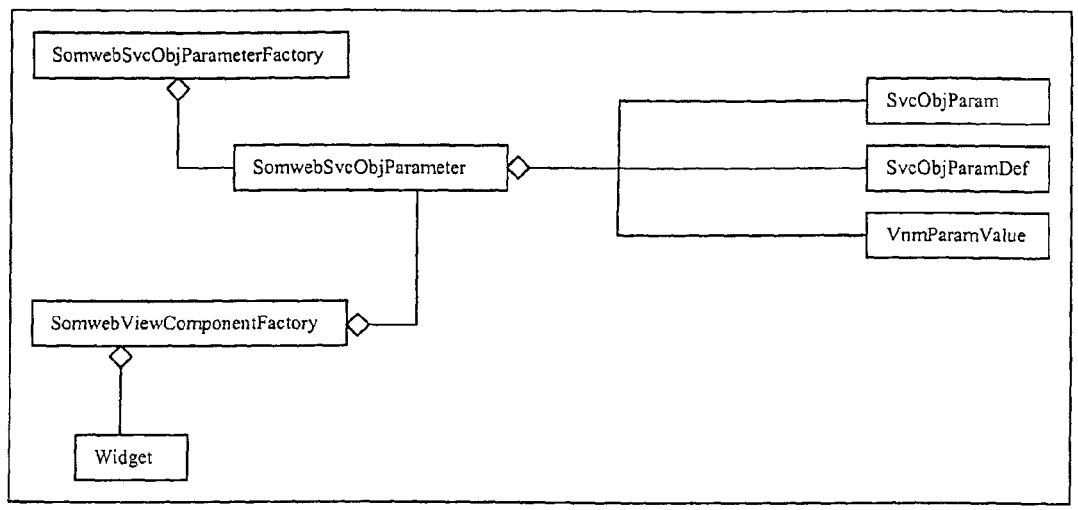
FIG. 12 is a class diagram showing a service object parameter class.

FIG. 2A is a block diagram that illustrates an overview of a web page generator system. FIG. 2B is a block diagram that illustrates further details of the web page generator of FIG. 2A. Referring first to FIG. 2A, a web browser 110A receives web pages for a user interface of a network management application that are generated by web page generator 202. A service object manager 104 is associated with service objects 102 and metadata definitions 106. The web page generator 202 receives service objects 102 and metadata definitions 106 and automatically generates web pages having a consistent user interface look and feel that implement business operations defined by the service objects and include data input elements for receiving data parameters defined in the metadata definitions. Thus, the service objects 102 provide business logic and the metadata definitions 106 provide parameters. In one embodiment, service objects 102 conform to a service object model (SOM). FIG. 12 is a class diagram for a service object parameter class.

Referring now to FIG. 2B, web page generator 202 comprises a server page generator 206, web controller 204, actions 208, widgets 210, and panels 212. In one embodiment, web page generator 202 is based on the Apache Struts framework, and utilizes the look and feel defined by Cisco's Picasso and UII. The web page generator 202 uses interfaces defined by the service objects 102 to interact with business logic for an application.

Figure 13:
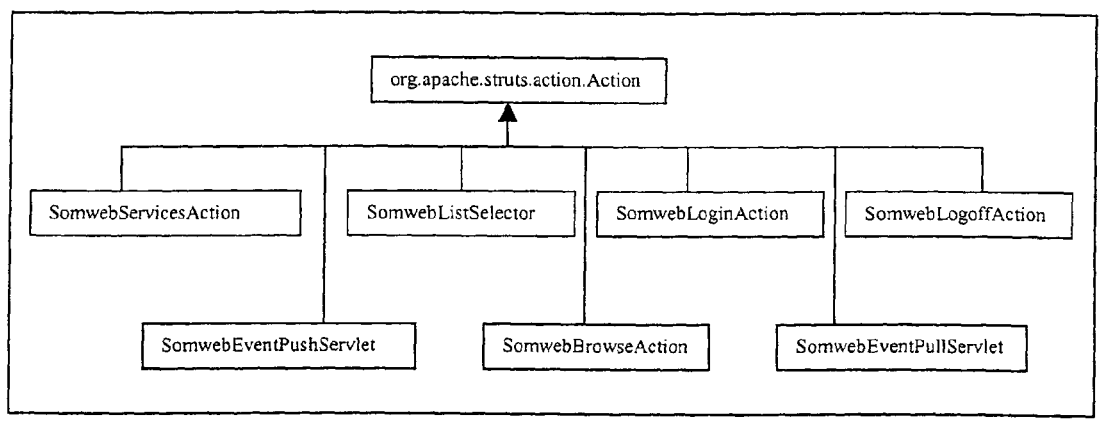
FIG. 13 is a class diagram showing an Action class.

Web controller 204 may be implemented as a servlet. The web controller 204 is responsible for security authorization and for dispatching user HTTP requests, which have been received from the browser 110A, to appropriate action classes. Actions 208 may be implemented as classes in an object-oriented environment such as Java®. The action classes 208 interact with service objects 102 through SOM interfaces that supply data from the service objects to the action classes in the form of service object parameters. FIG. 13 is a class diagram for an example action class. Based on such service object data, one or more widgets 210 are instantiated and are arranged into a specified layout within panels 212. When an action 208 completes processing, the web controller 204 forwards the user request to the server page generator 206, which renders the final user interface for display by browser 110A.

In one embodiment, server page generator 206 comprises one or more JSP pages. In another embodiment, web page generator 202 further comprises the Jakarta Tomcat engine that provides a servlet/JSP engine for handling HTTP requests, and the Struts framework from Apache may be used to implement web controller 204.

Service object manager 104 is associated with metadata definitions 106. Thus, web page generator 202 can receive metadata information from SOM interfaces provided by service object manager 104. Metadata for a service object 102 defines properties of the object. Each property definition includes information that enables the web page generator 202 to produce HTML appropriate to render a user interface, and to produce JavaScript that can perform validation operations on values entered by users in the user interface.

As described in the Background, typical JSP development involves using custom tags to perform UI related logic; the tags help in hiding underlying program code so that, for example, a JSP page looks more like an HTML page that can be constructed using third party tools. While this approach enhances readability and maintainability of JSP pages, the tags are processed by a JSP container and are not flexible enough to be manipulated programmatically, and are not suitable for dynamic generation of UI. To overcome this limitation, web page generator 202 uses an approach based on widgets 210 to generate a consistent UI. In this approach, properties of service objects 102 are associated with widgets 210, which have several functions.

First, widgets 210 represent object properties by HTML elements such as text fields, selection lists, etc., so that the browser can display the property in an appropriate manner. Second, widgets 210 generate Javascript code that can perform client-side data validations, including checks for data type, range, mandatory parameters, etc. The Javascript code becomes part of an HTML page that is generated by server page generator 206, and is executed by web browser 110A when such an HTML page is loaded by the web browser. Third, once a user enters data in the user interface and submits an HTTP request from browser 110A that contains the data, widgets 210 convert the data from the HTML elements of the HTTP request back to Java® objects of an appropriate data type.

In one embodiment, widgets 210 are implemented as Java® classes. Further, in one embodiment, widgets 210 are defined according to a containment hierarchy. Thus, widgets 210 may contain other widgets that may again contain other widgets and so on. Such a containment hierarchy of widgets 210 enables web page generator 202 to decompose complex object properties so that they can be represented by basic HTML elements in a user interface page. Further, the containment hierarchy enables assembling data from the widgets to form complex data objects that form values of complex properties.

As an example, assume that an object among service objects 102, called "Customer," has a property named "address," which is another object, and other properties such as "CustomerName" and "EmailAddress". The EmailAddress property is represented by a widget 210 called EmbeddedObject. The EmbeddedObject widget 210 represents properties of the "address" object by other widgets, and takes data from other widgets and creates an Address object that becomes the value for the "address" property in the Customer object.

Figure 20:
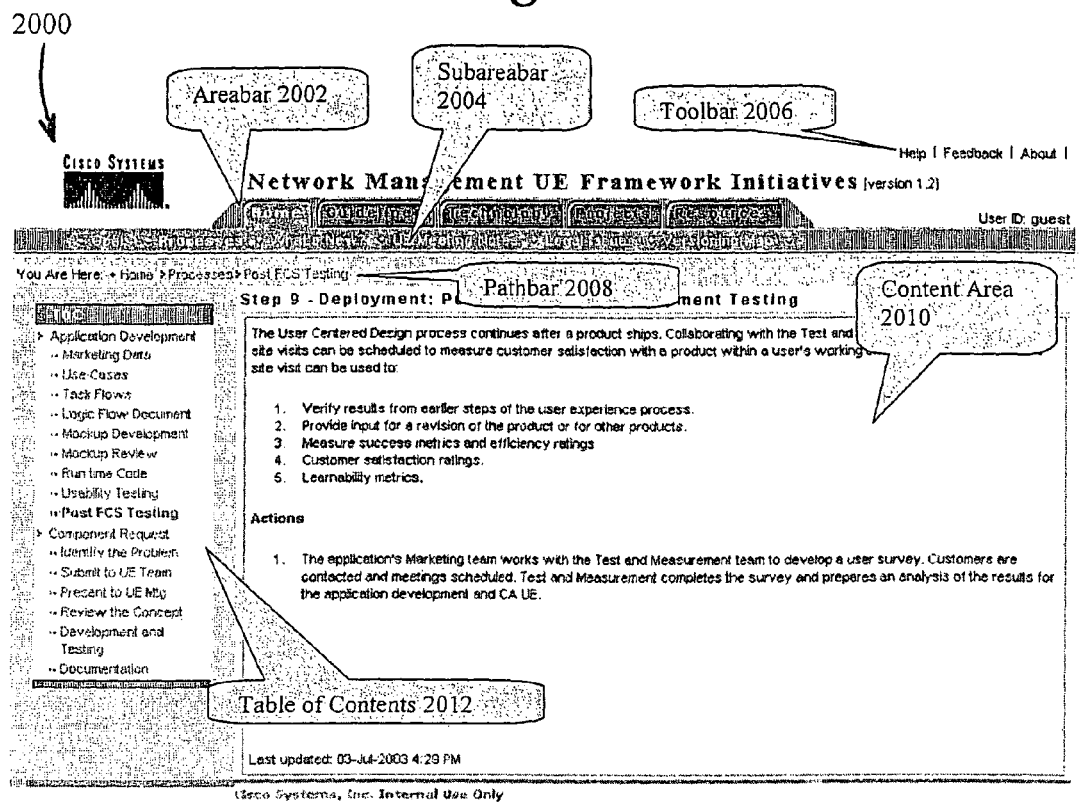
FIG. 20 is a block diagram of a Picasso screen layout.

In one embodiment in which server page generator 206 implements the Picasso framework, a user interface screen display for a network application comprises an area bar, path bar, table of contents, content area, and toolbar. FIG. 20 is a block diagram of a Picasso screen layout. An example screen 2000 for a network management application comprises an area bar 2002, sub area bar 2004, toolbar 2006, path bar 2008, content area 2010, and table of contents 2012. The area bar 2002 and sub area bar 2004 display function tabs that are specific to a particular application. The path bar 2008 displays a navigation path to inform the user about the user's then-current location within the application. The table of contents 2012 provides assistance with navigation. The content area 2010 contains substantive information content for an application. The toolbar 2006 is displayed at the top right corner and provides basic information tools such as Help, About, etc. SiteMap XML documents define the layout of the content area and a hierarchy of pages that make up an application. APPENDIX 1 presents a sample SiteMap XML file.

While certain embodiments support the Picasso user interface style, other embodiments can support any other style. Widgets 210 are used to generate the content area of a Picasso user interface; no tag libraries are used. Further, with a system that includes web page generator 202, developers do not need to code, create or modify JSP pages, servlets, or actions, and need not know any web programming. Instead, developers can concentrate on developing business logic as embodied in service objects 102. The web page generator 202 interacts with program business logic through the service object interfaces, and dynamically generates the entire user interface including validation logic and data type conversions. As an example, typically several hundred of JSP pages, Action classes, and Bean classes are used in a network management application that is built on Picasso, and all such classes are created by the application developer. In the approach herein, only about ten JSP pages, Action classes, and Bean classes are used. As a result, development delays and software maintenance costs are greatly reduced.

Figure 16:
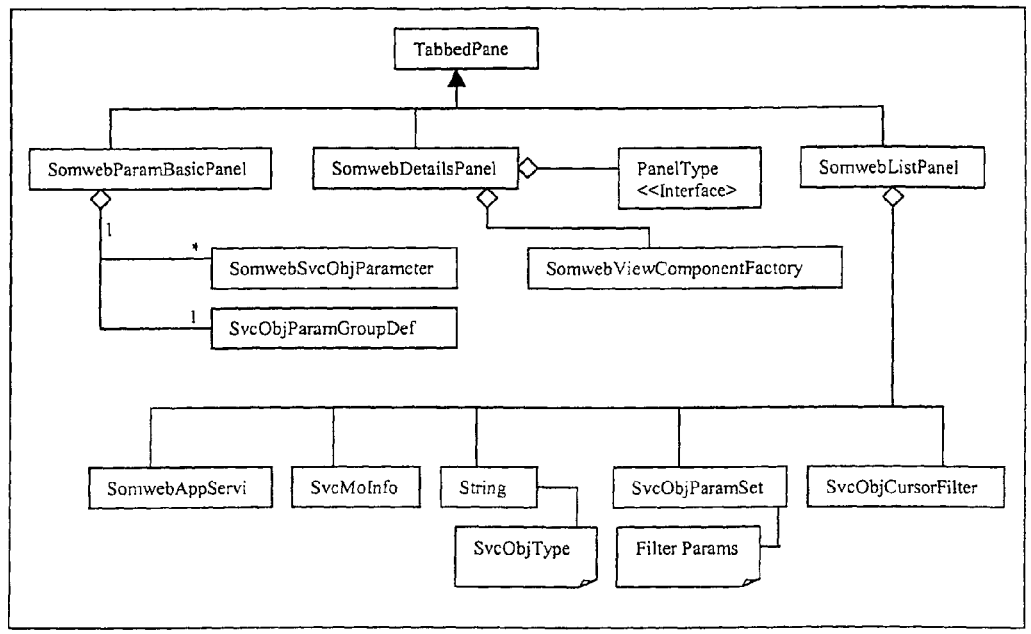
FIG. 16 is a class diagram showing panel classes.
Figure 17:
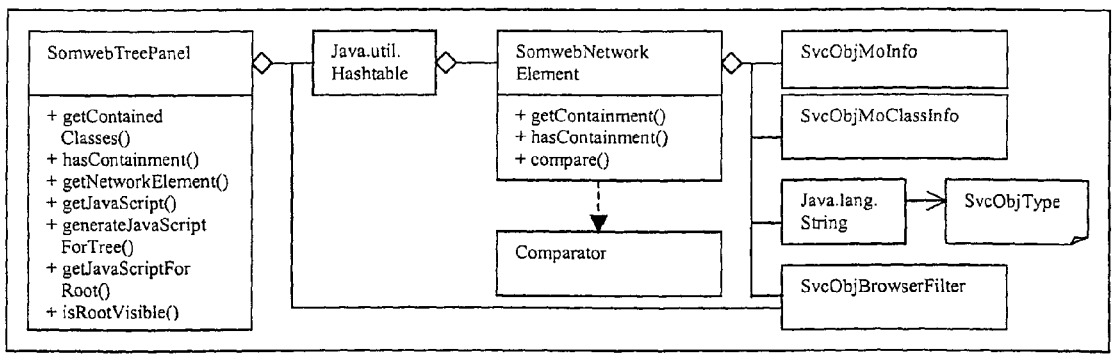
FIG. 17 is a class diagram showing tree management classes.
Figure 18:
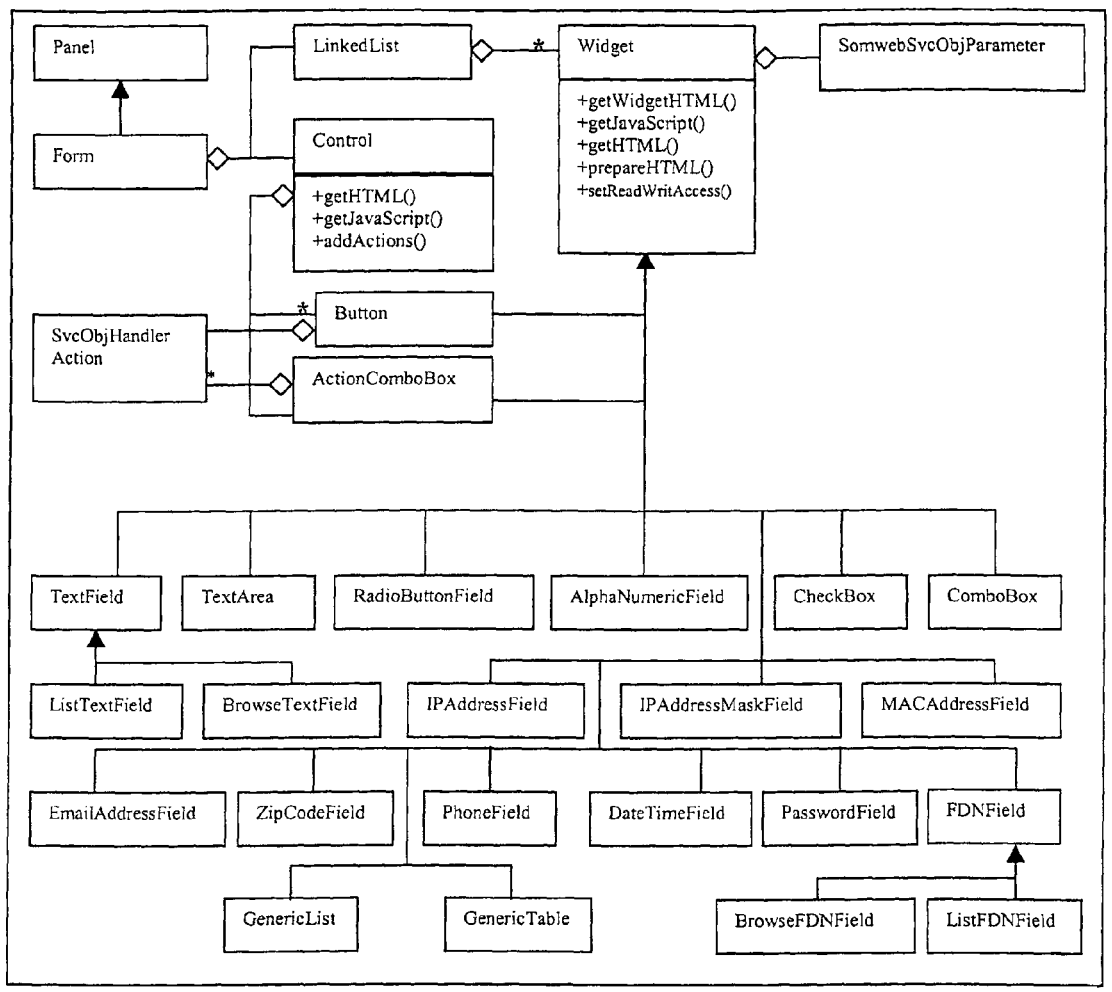
FIG. 18 is a class diagram showing widgets classes.

Panels and widgets may be implemented in an object-oriented environment. As examples of class relationships that may be used in an implementation, FIG. 16 is a class diagram showing panel classes; FIG. 17 is a class diagram showing tree management classes; and FIG. 18 is a class diagram showing widgets classes.

Figure 3:
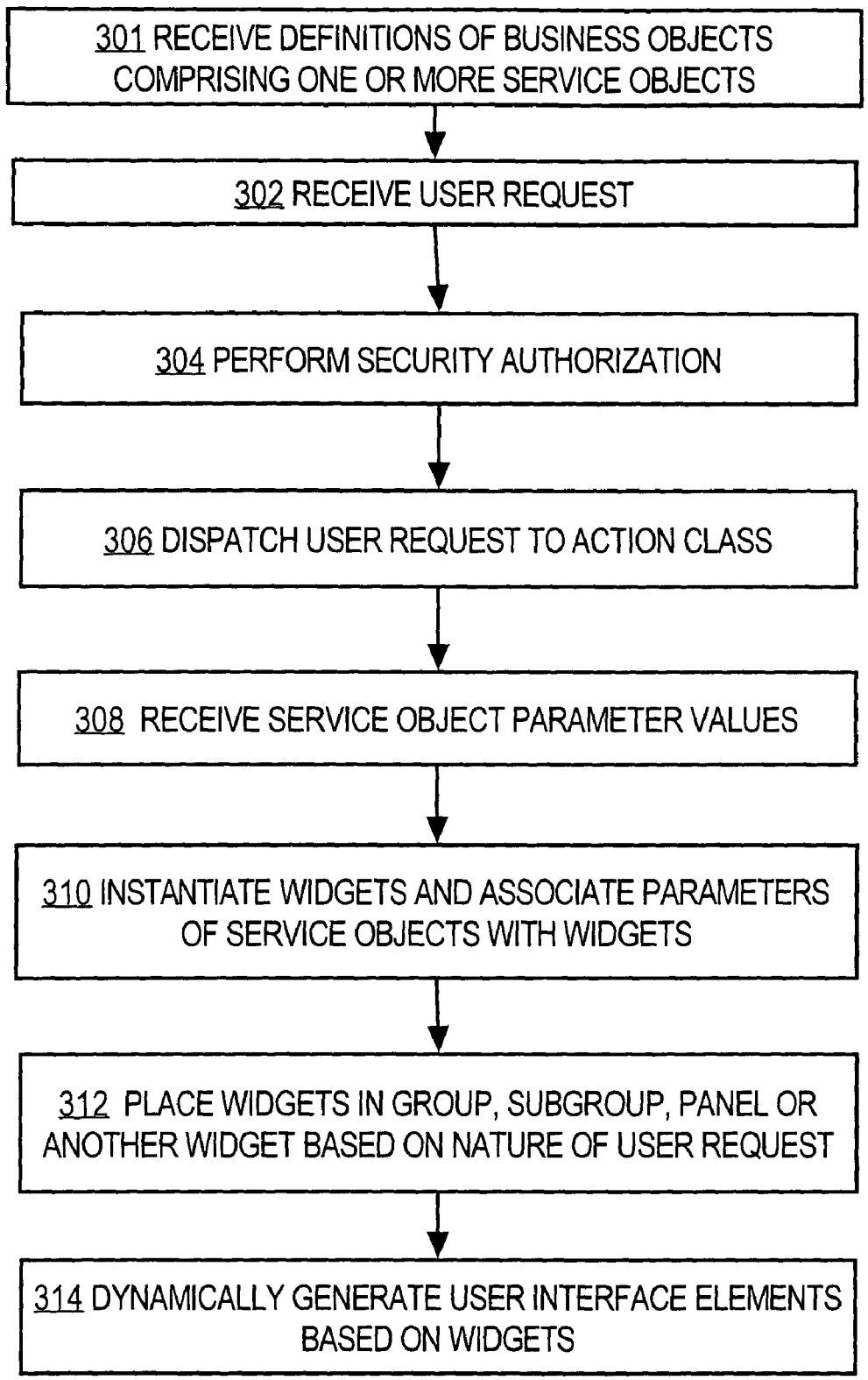
FIG. 3 is a flow diagram that illustrates a high level overview of one embodiment of a method for generating consistent user interfaces.

FIG. 3 is a flow diagram that illustrates a high level overview of one embodiment of a method for generating consistent user interfaces. For purposes of illustrating a clear example, FIG. 3 is described below with reference to FIG. 2A, FIG. 2B. However, FIG. 3 is broadly applicable to other embodiments and contexts.

In block 301, definitions of business objects comprising one or more service objects are received. For example, a software developer creates service objects 102 that perform business logic operations for a network management application. Alternatively, the service objects 102 are created prior to performing the method of FIG. 3, and are retrieved from storage or otherwise received.

In block 302, a user request is received. For example, a user interacting with web browser 110A browses to an HTML page associated with the network management application. The user selects a link associated with a particular operation of the network management application. Browser 110A forms an HTTP POST request that includes information identifying the link and sends the request to a server that is executing server-side elements of the network management application.

In block 304, a security authorization is performed. For example, web controller 204 inspects information in the user request to determine what application operation has been requested and which user requested it. Web controller consults a security database, which is omitted from FIG. 2B for clarity, to determine whether the identified user is authorized to perform the requested operation. If so, then control proceeds to block 306. If security authorization fails, then an error message is returned to the user. In other embodiments involving applications for which security is not an issue, block 304 is omitted.

In block 306, the user request is dispatched to an action class. For example, web controller 204 determines which class among actions 208 is responsible for acting on the user request. As one example, one action class may be responsible for processing a user request that seeks a network topology display, and another action class may be responsible for processing a user request that seeks to display a then-current network device inventory.

In block 308, one or more service object parameter values are received. For example, actions 208 use SOM interfaces to request and receive service object parameter values from service objects 102. As an example, assume that a user request seeks to obtain a network topology display. To create the display, an associated action 208 may need to receive a range of IP addresses defining a subnet that the user wishes to see in the topology display. Therefore, the action 208 accesses a "SubnetRange" service object among service objects 102 and determines that properties of the SubnetRange service object comprise LowerIPAddress and UpperIPAddress.

In block 310, one or more widgets are instantiated, and the parameters of the service objects are associated with the widgets. For example, a first widget 210 is instantiated for receiving a value for the LowerIPAddress parameter, and a second widget 210 is instantiated for receiving a value for the UpperIPAddress parameter. The widgets are associated with the respective parameter values.

In block 312, the widgets are placed in a group, subgroup, panel or another widget based on the nature of the user request. For example, the first and second widgets 210 are placed in a panel object that is associated with a user interface screen display panel that prompts the user to enter upper and lower IP addresses for the topology display.

In block 314, user interface elements are dynamically generated based on the widgets. For example, an HTML page, JSP page, Javascript, etc., are dynamically generated to create a user interface page that is consistent in look and feel with other pages that are generated by the web page generator 202.

Unlike prior approaches, in the approach herein the web page generator 202 takes care of generating the user interface completely and enables developers to concentrate more on the business logic layer. Developers need not repeat developing custom JSPs for every project. Further, the approach herein provides a data-driven approach for application development. Such an approach is especially powerful where certain user inputs and parameters are unknown until runtime. For example, this approach enables users to define their own templates that can be downloaded to the devices and provide data for the template. The approach improves the user experience by providing a standard look and feel throughout an application. In addition, the approach drastically reduces maintenance problems associated with developing JSPs.

3.0 Implementation Example

A detailed example implementation of the foregoing general approaches is now described.

3.1 Struts Configuration

In one embodiment, the Struts framework is configured as described in this section to provide web controller 204. The Struts framework includes a default Controller Servlet and is usually associated with "*.do" path. Thus, any HTTP requests with a ".do" extension are addressed by the Controller Servlet, which looks in a configuration file for a mapping of an action classes associated with the current path and invokes a method called "perform".

The Picasso framework extends this technique to control the JSP pages by defining an action "forwardToScreenId" that forwards the request to a JSP page. For this reason, global forwards also have an action defined with the same name. In one embodiment, the Global Forward is defined as <forward name="Home" path="/index.jsp?sid=Home"/> and the associated Action is <action path="/Home" type="com.cisco.nm.uii. forwardToScreenID"/>. In the global forward definition, sid indicates a screen identifier and is used by a Picasso runtime engine to pull information associated with the screen from the Picasso layout configuration XML (Appendix 1).

Defining forwards for Service Objects requires an additional parameter called "newObjType" to identify the current Service Object. For example, the Global Forward is defined as <forward name="Site" path="/indexjsp?sid=Site& newObjType=Site"/>, and the Action is <action path="/Site" type="com.cisco.nm.uii.forwardToScreenID"/>. In the approach herein, another type of forward is defined and is used locally in Actions 208. The forward defines a template so that the request is forwarded to the service object by setting a parameter called "content" to the JSP page given in the template. For example, the following forward may be used: <forward name="modify" path="SvcObjForward/basicPane. jsp"/>.

Assuming the current service object is "Customer", the above forward is converted into a path of "/index.jsp?sid=Customer& newObjType=Customer&content=basicPanejsp".

APPENDIX 2 presents is a complete example Struts configuration file.

3.2 Custom Tags

In one embodiment, web page generator 202 uses Custom tags, as defined in Picasso, and also defines a ContentAreaTag and PageTitleTag. The ContentAreaTag looks for the value for "content" parameter and includes the JSP file that is supplied as the value of "content". If that parameter is not found, then the tag provides the same processing as the Picasso ContentArea tag. The PageTitleTag provides content area title based on the user actions.

3.3 Developing Content; Performing Client-Side Content Manipulation and Validation Developing a user interface for an application that is accessed using a web browser involves creating HTML documents for the browser so that the browser can show the specified UI elements in the right layout. In one embodiment, as shown in FIG. 2B, content generation is provided though JSP files 222 that interact with certain core classes 220 of web page generator 202. Additionally, the content may comprise static HTML pages 224.

Web page generator 202 further supports content generation through style sheets 226 and images 228, which help make the UI more appealing and also provide consistency across various pages in an application that uses service objects 102. Picasso defines standard styles for most elements displayed in a UI; however, style sheets 226 and images 228 may define, for example, action buttons such as 'List', 'Apply', 'Add', etc., with the same look and feel. In one embodiment, a style named mdm_btn is defined and included in the JSP.

Web page generator 202 further supports client side dynamic content manipulation and validations using client program code 230. As an example, client program code 230 may comprise Javascript code. However, any other form of client-side executable code may be used.

In one embodiment, client program code comprises one or more Javascript files which, when executed by browser 110A, perform the following functions: store a path and to include other Javascript files; detecting the type of browser used by the user and alerting users who are using old browsers; generating alerts and error messages; enabling and disabling buttons on the various screens at run time, depending on the user selection; and other common functions. As an example, the function for enabling and disabling buttons may be used to "gray out" buttons that are inapplicable to a particular function.

Client program code 230 also may comprise one or more Javascript files for performing common validations for various form elements, e.g., checking data types and ranges; checking whether mandatory fields are populated before submitting a form; checking dependencies and validations upon moving out of a field; creating a pop-up window, e.g., for a details screen; copying values from and to a pop up window and populating all the forms in the main screen; and others. In one embodiment, specific validations for IPAddressField, DateTimeField, etc. may be provided in client program code 230.

The client program code 230 also may implement multi-selection of service objects, selection of different service objects in a browse selection popup, and other features. Multi-selection of service objects is achieved by a keeping a count of the number of rows selected and then updating the count for each selection and de-selection. Depending on the count and the type of selection, all the buttons are evaluated to determine if an action is permitted. For example, viewing two service objects is not allowed, in one embodiment. When two rows are selected, a function is called to check whether the buttons should be enabled or disabled. For multi-selection, the 'View' button is listed as invalid action in the invalidActions array. The check fails and the button is disabled.

Further, for certain objects, a Browse Selection should be able to select multiple service objects. For example, for a provider edge device ("PE") Interface, the selection could be a Serial Interface or a Sub Interface and also to allow the selection of only leaves and not the nodes. This is achieved by modifying the PeInterfaceDd class to send the service object name as 'Leaf|SerialInterface|SubInterface'. This string is then parsed by using the browserForValue Javascript function to find out that more than one Service Object can be selected, and sending the Service Objects to the pop-up. Upon selecting a link for the pop-up, the validation function finds the Service Object type and whether the object is a node or a leaf. Such values then are matched to the values set by the browseForValue function. If either service object type is selected, then the object can be selected. Otherwise, an error is thrown.

In one embodiment, JSP files 222 comprise the following, and each of the JSPs can access core classes 220 and service objects 102 which generating UI pages in cooperation with server page generator 206. A JSP named login.jsp is the default page for an application, accepts the username and password and passes them on to back-end objects for creating a user session for validation; if the username and password combination is wrong, the user is shown the unauthorized.jsp page. An index.jsp page is provided. All requests of the form "*.do" are calls to index.jsp. In response, an address of the request is resolved, responsive content is embedded in index.jsp, and the content is sent to the Tomcat engine for display. A listPane.jsp page is the default JSP for all Service Objects; it provides logic to display objects as a list and provides functions such as scrolling, fetching the next set of rows, etc.

An initPane.jsp page provides functionality to display an Initial screen that contains all the initial parameters specified by the ServiceObject either in metadata or defined or defined in the Handler classes. A basicPane.jsp page provides functionality to display a Basic screen that contains all the basic parameters specified by the ServiceObject either in metadata or defined in the Handler classes. A detailsPane.jsp page provides functionality to display a Detail screen that contains basically all the parameters specified by the ServiceObject either in metadata or defined in the Handler classes. A wizardPane.jsp page provides functionality for wizard navigation that is driven by screen attributes for parameters defined either through metadata or through the Handler classes.

3.4 Metadata Definitions

An example of metadata definitions 106 in XML form is provided in APPENDIX 3. In general, an XML implementation of metadata definitions 106 may define services, packages, service objects, parameter groups, initial parameters, other parameters, and parameter sets. The following section describes general aspects of each such definition.

Defining Service:

Element: svcDef

Description: Defines a group of Service Objects that are part of the service.

Attributes:
    name—takes any string as value.

Contained In: ROOT (Not contained in any other element)

Element: svcObj

Description: Used to add a service object to the list of Service Objects in a svcDef.

Attributes:
    name—takes any string as value.

Contained In: svcObj.

Defining Package:

Element: packageDef

Description: Defines a package in which Service Objects are defined.

Attributes:
    name—takes any string as value.

Contained In: ROOT (Not contained in any other element)

Defining Service Object:

Element: objectDef

Description: Defines a Service Object in a package.

Attributes:

Contained In: packageDef
    Table 1 below provides example attributes for the objectDef element:

TABLE 1

Attributes of objectDef

| Attribute | Possible Values | Description |
| --- | --- | --- |
| name | Any allowed table name for the database. | Name of the service object; may be used as table name in the database, in naming java classes in CmServer and in Javascript. Also used as screenId in defining the SiteMap XML. |
| label | Default: Value of Name. | Label to be displayed in the UI for the Service Object |
| namingAttribute | Parameter name. Not applicable if dbtable = "NULL" | Parameter to be used to construct FDN. Primary key on the table. |
| dbtable | Allowed table name for the database or NULL. Default: Value of name. | Specifies the name of the table this object represents in the database. . Specifying the value as NULL makes the object non-persistent. No database table is created. |

TABLE 1-continued

Attributes of objectDef

| Attribute | Possible Values | Description |
| --- | --- | --- |
| handler | Java class implementing Handler interface. | Specifies the implementation of Handler interface to be used. |
| browser | Java class implementing Browser interface. | Specifies the implementation of Browser interface to be used. |
| iterator | Java class implementing Iterator interface. | Specifies the implementation of Iterator interface to be used. |
| cursor | Java class implementing Cursor interface. | Specifies the implementation of Cursor interface to be used. |

Parameter groups, initial parameters, and other parameters are defined as follows:

Defining Parameter Groups:

Element: paramGroupDef

Description: Defines a parameter group for a service object.

Attributes:
    name—Name of the parameter group.
    label—Label of the tab for displaying the group of parameters.
    wizard Text—<< >>

Contained In: objectDef

Defining Initial Parameters:

Element: initParamDef

Description: Defines a parameter to be displayed in the initial screen.

Attributes:

Contained In: objectDef

Defining Parameters:

Element: paramDef

Description: Defines a parameter to be displayed in the basic/details screen.

Attributes:

Contained In: objectDef

Table 2 below provides example attributes for the paramDef element:

TABLE 2

Attributes of paramDef

| Attribute | Possible Values | Description |
| --- | --- | --- |
| screen | basic, details<br>Default: details. | Value indicates that the parameter needs to be shown on the screen by default (screen = "basic") or the value should be shown only when the user views the details page (screen = "details") |
| groupName | Groups defined via paramGroupDef tag for the service object.<br>Default:general | Ties a parameter to a defined group, which ensures that all parameters belonging to a particular group are bundled and shown together in the UI. Each group is displayed in a separate tab in the Details screen. |
| subGroupName | | Used to group related components together in a given screen. The components are showed in a bordered panel with the subGroupName as title. |
| access | Combination of create_rw, modify_rw, create_ro, modify_ro, create_na, modify_na.<br>Default:<< >> | Indicates of scope of modification of the value of the parameter. For example, access = "create_rw, modify_ro", means that while creating the object, the value can be changed(rw), but while modifying, the parameter will be disabled. |
| datatype | string, int, enum, sternum, date, set, seq, seqOf, paramSetValue. | Indicates data type of parameter. |
| name | Allowed Java/JavaScript variable name. | Name of parameter; used as a variable name. |
| label | Meaningful string literal.<br>Default: Value of name. | Label that is displayed in the UI. |
| dbtype | Allowed data types for the database used. | Indicates data type of the column the parameter represents in the database. |

TABLE 2-continued

Attributes of paramDef

| Attribute | Possible Values | Description |
|---|---|---|
| | Default: same as datatype. | For eg. 'enum' datatype values are stored as int in the database. A parameter is made transient (non-persistent) by setting dbtype = "NULL". These parameters are used by the GUI to compute other parameter values. |
| webComponent | Any available widgets. Default: TexField for string,int datatypes ComboBox for sternum, enum | This is a widget displayed in the GUI for the parameter. |
| webComponentProperties | -N/A- | Provides additional properties for the webComponent. |
| webComponentModel | Any custom Model class extending SomwebSvcObjParameter class. Defaul:t SomwebSvcObjParameter | The name of the Model class to be used with the webComponent. |
| location | north, south, east, west Default: north | Specifies the location of the component in a group (panel) as per Java BorderLayout. |
| guiComponent | -N/A- | Widget for Java UI. |
| guiComponentProperties | -N/A- | Properties for Java GUI Component. |
| toolTip | Meaningful information string. Default: Value of label. | This value indicates the ToolTip that should be displayed when the cursor is moved over the parameter on the GUI. |
| mandatory | true, false. Default: false. | Indicates the UI that a user must enter the value without which the data will not be submitted to the server. Represented in the UI with a red asterisk against the label of the parameter. |
| dependencies | Can be one or more (a comma separated list) of the parameters that come on the same screen as this parameter. | Indicates that the parameter is dependent on the specified parameter. This attribute is used to enable, disable components and to supply filter for tree browser object selectors. |
| <<CustomStrings>> | Examples: - ObjType, browser, used by BasicBrowseDd - detailsLabel used by EmbeddedObject -format used by FDNField | These are custom strings defined by individual widgets; can also be put as part of webCompProperty attribute separated by semi-colon. |

Parameter sets are defined as follows:

Defining Parameter Sets:

Element: paramDef

Description: The parameters included (as paramSetItem fields) in this tag are included in the MoInfo of the object.

Attributes:
name—takes any string value. Specifying name="summary" defines a paramSetDef to be used in displaying the list.

Contained In: objectDef

Element: paramSetItem

Description: Adds a parameter to the list in paramSetDef.

Attributes:
Name—takes any string value.

Contained In: paramSetDef 3.5 Process Flow During User Interactions

Core classes 220 of web page generator 202 support user login, generating table of contents items and list panes for a dynamically generated user interface, adding panes to a dynamically generated user interface, responding to selections of generic buttons in user interface screens such as an Apply button, and provide other functions. In one embodiment, core classes 220 include a LoginAction class, Application Service or AppService class, and others as illustrated further in FIG. 4-FIG. 14, inclusive.

Figure 4:
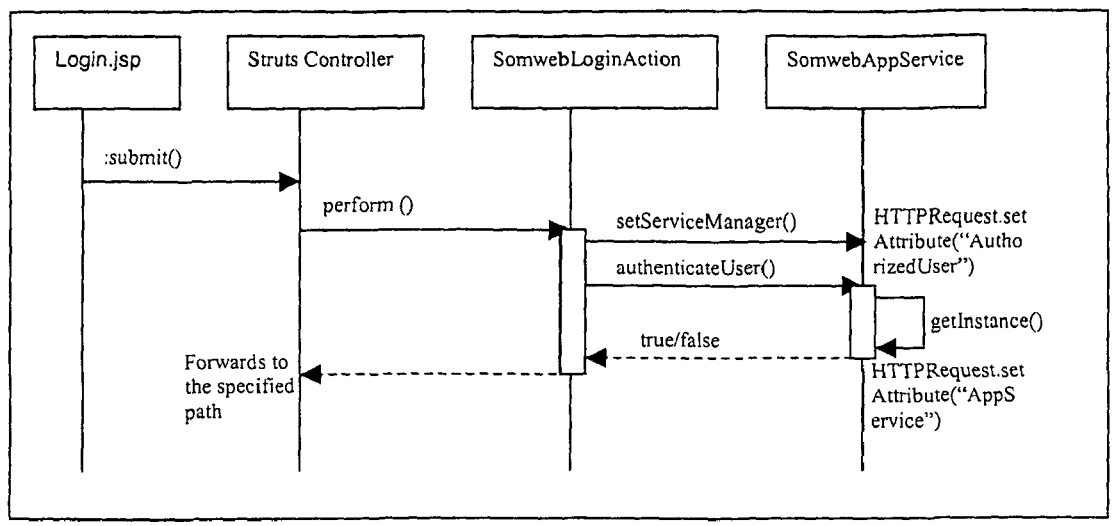
FIG. 4 is a process flow diagram that illustrates a user login interaction.
Figure 5:
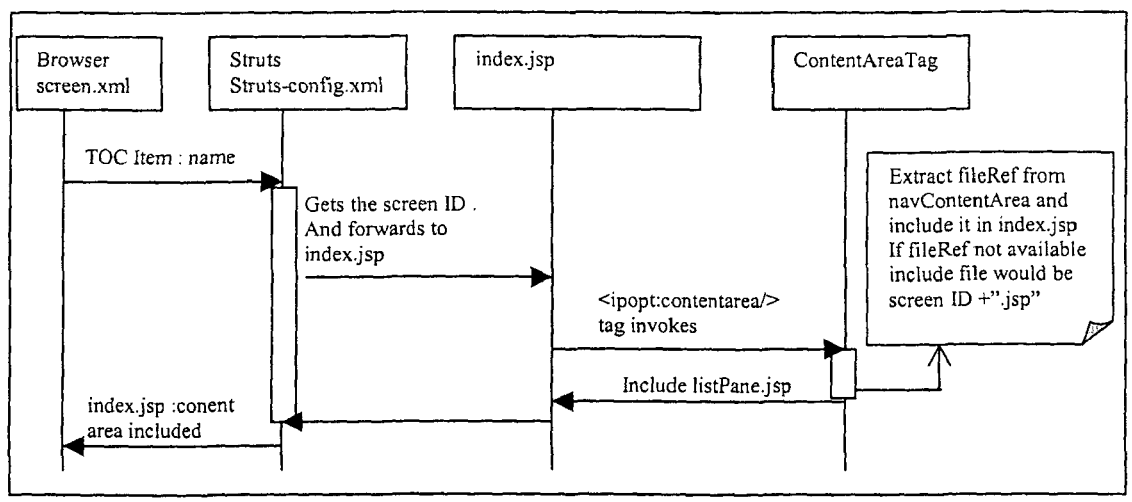
FIG. 5 is a process flow diagram that illustrates a user interaction with a table of contents and list pane.
Figure 6:
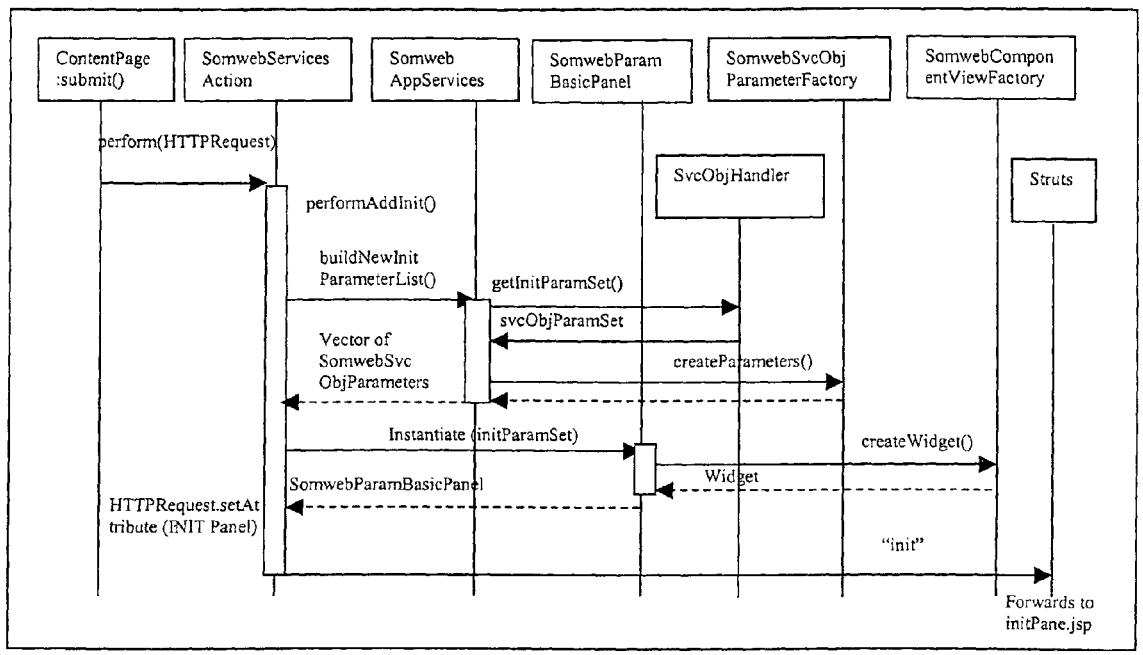
FIG. 6 is a process flow diagram illustrating an interaction for adding an initial pane.
Figure 7:
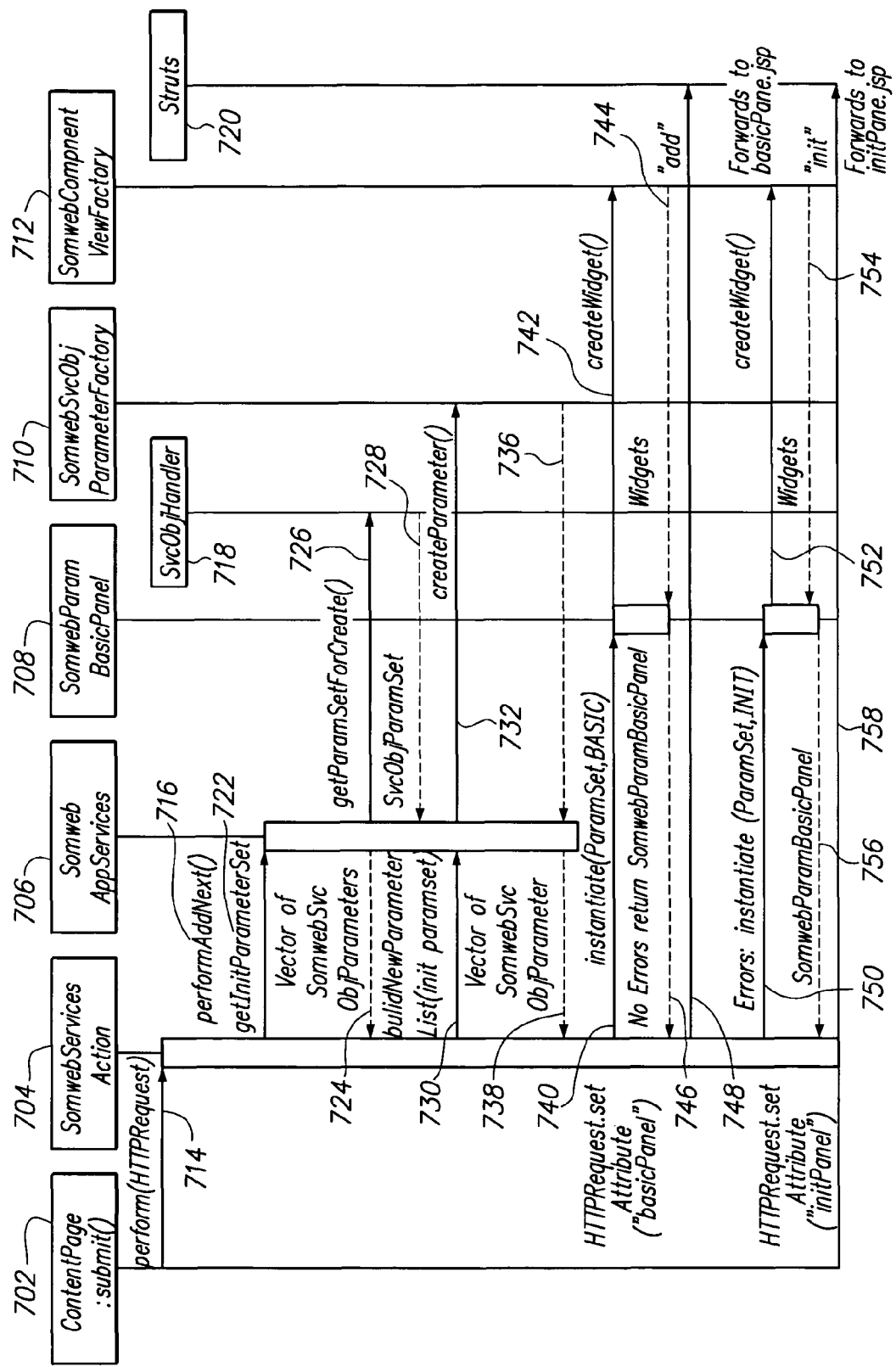
FIG. 7 is a process flow diagram illustrating an add basic pane interaction.
Figure 8:
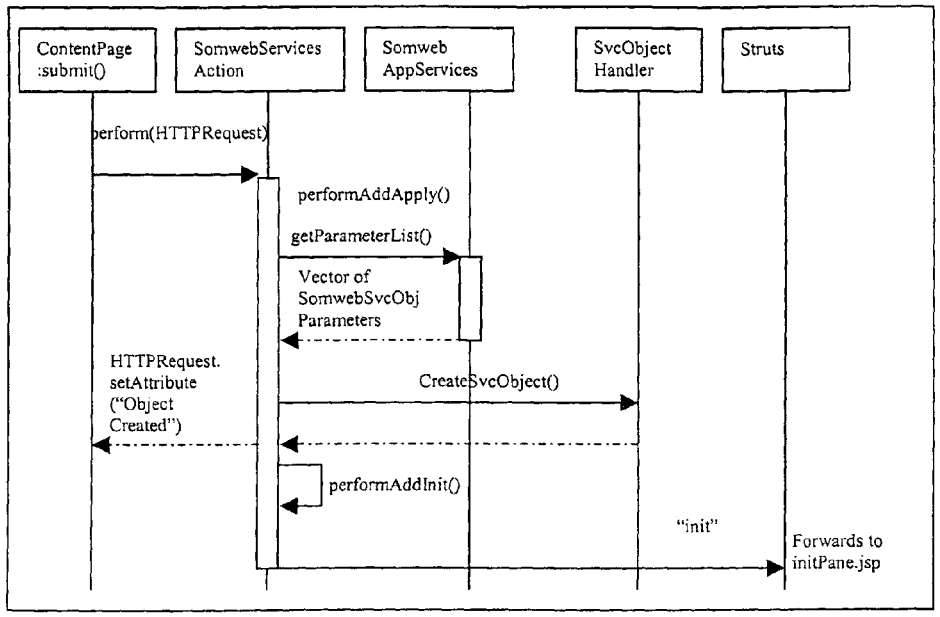
FIG. 8 is a process flow diagram illustrating an interaction in response to selecting an Apply button in an Add screen.
Figure 9:
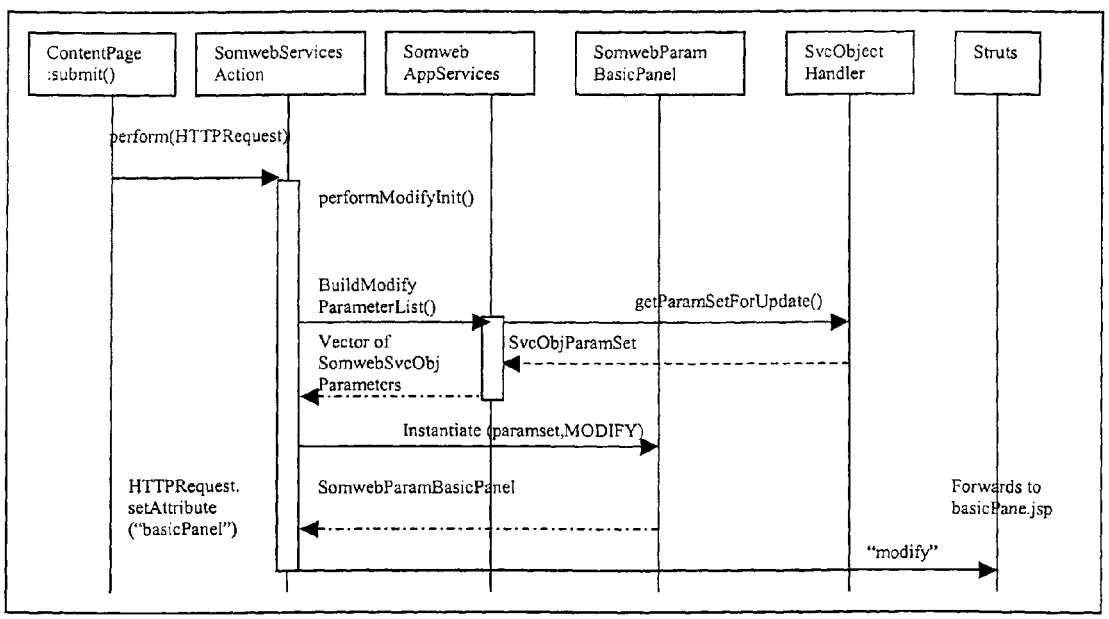
FIG. 9 is a process flow diagram illustrating a modify basic pane interaction.
Figure 10:
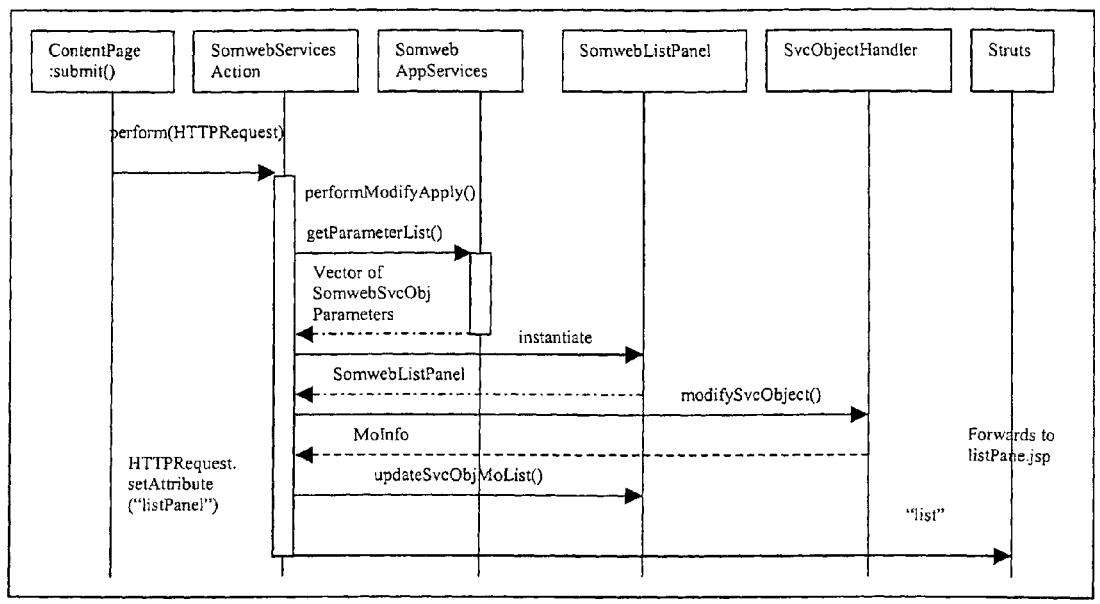
FIG. 10 is a process flow diagram illustrating an interaction in response to selecting an Apply button on a Modify screen.
Figure 11:
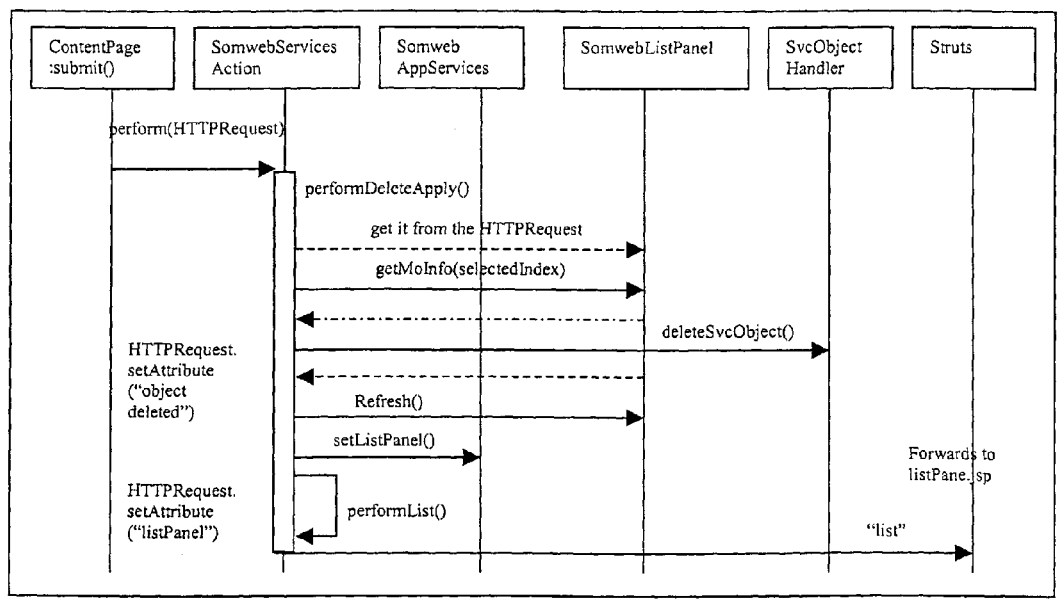
FIG. 11 is a process flow diagram illustrating an interaction in response to selecting an Apply button in a Delete screen.

Drawing figures FIG. 4-FIG. 14 include self-explanatory text describing interactions of JSPs, classes, and other elements of web page generator 202 to perform specific functions. In particular, FIG. 4 is a process flow diagram that illustrates a user login interaction; FIG. 5 is a process flow diagram that illustrates a user interaction with a table of contents and list pane; FIG. 6 is a process flow diagram illustrating an interaction for adding an initial pane; FIG. 7 is a process flow diagram illustrating an add basic pane interaction; FIG. 8 is a process flow diagram illustrating an interaction in response to selecting an Apply button in an Add screen; FIG. 9 is a process flow diagram illustrating a modify basic pane interaction; FIG. 10 is a process flow diagram illustrating an interaction in response to selecting an Apply button on a Modify screen; and FIG. 11 is a process flow diagram illustrating an interaction in response to selecting an Apply button in a Delete screen.

Figure 14:
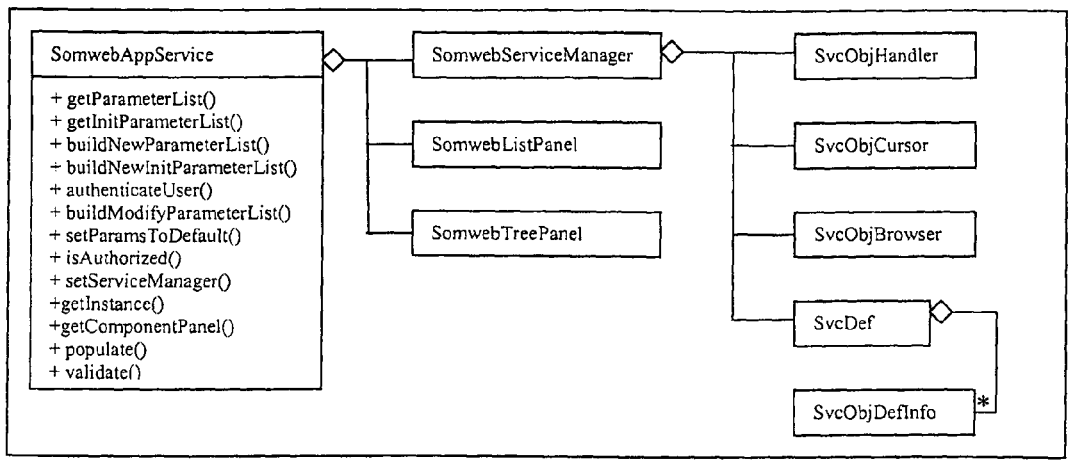
FIG. 14 is a class diagram showing an application service class.

To illustrate a clear example, FIG. 7 is now described. FIG. 7 illustrates process steps performed by internal components of web page generator 200 in response to a user selecting a Next button that adds a basic pane to a user interface window. The description herein of FIG. 7 assumes familiarity with the class diagrams that are presented elsewhere herein. For example, FIG. 14 is a class diagram for an application service class that may form part of core classes 220 and provide services to applications. FIG. 16 is a class diagram showing panel classes; FIG. 17 is a class diagram showing tree management classes; and FIG. 18 is a class diagram showing widgets classes.

Referring now to FIG. 7, interactions are shown for a ContentPage submit( ) method 702, Services Action object 704, App Services object 706, ParamBasicPanel object 708, ServiceObjectParameterFactory object 710, ComponentViewFactory object 712, ServiceObjectHandler 718, and Struts framework 720.

Selecting a Next button results in invocation of the submit( ) method 702 to perform the contents of an HTTP request that indicates the Next button selection, as shown by arrow 714. The HTTP request is received by the Services Action object 704, which invokes an AddNext( ) method to process selection of the Next button in an Add screen, as indicated by reference numeral 716. The Services Action object 704 then invokes a getINitiParameterSet method, which requests the AppServices object 706 to provide parameters for the Next action. The AppServices object 706 returns a vector of object parameters, as indicated by arrow 724, which vector is initially empty. The AppServices object 706 then invokes a getParamSetForCreate( ) method of the ServiceObjectHandler 718. In response, the ServiceObjectHandler 718 returns a service object parameter set as indicated by arrow 728.

The ServicesAction object 704 invokes a buildNewParameterList method of the AppServices object 706 as shown by arrow 730, which responds by invoking a createParameter( ) method of the ServiceObjectParameterFactory 710 as indicated by arrow 732. Parameters are then returned to the ServicesAction object 704 as indicated by arrows 736, 738.

Upon receiving the parameters, the ServicesAction object 704 invokes an instantiate method of the ParamBasicPanel object 708, as shown by arrow 740. In response, the ParamBasicPanel object 708 invokes a createWidget( ) method of the ComponentViewFactory object, as shown by arrow 7420. This results in the creation of a widget appropriate for the user interface, which is returned as indicated by arrow 744, 746.

If no error occurred in the course of creating the widget, then a basic panel of the user interface is instantiated and forwarded with the widget information to a basicPanel JSP page for final creation of HTML and delivery to the browser, as indicated by arrows 746, 748. If an error occurred, then an "init" panel is instantiated and forwarded with the widget information to an initPanel JSP, as indicated by arrows 750, 752, 754, 756, 758.

As a result, user interface pages are automatically created based on desired actions and metadata definitions of parameters, without requiring a developer to manually code the pages, supporting Javascript code, JSPs, etc.

3.6 Security Interfaces

In one embodiment, core classes 220 define three security interfaces that are implemented by an application, denoted an Authorize interface, Authenticate interface, and SecurityChecker interface. The Authorize interface implementation class is responsible for adding or removing screen identifiers from the screen, that is, adding and removing Area Items, Sub Area Items, and table of contents items depending upon the role or permissions of a user. The Authenticate implementation class is used to authenticate a user. The SecurityChecker implementation class is responsible for adding or removing action buttons such as Add, Modify, Delete, etc., based on the permissions of a user.

In one embodiment, when a user logs in, control passes to a class called Controller, which is responsible for calling the correct Authorize and Authenticate implementation classes at runtime. As a result, the user can view only those tabs and TOCs for which the user has permissions.

The SecurityChecker implementation class is called when the user views a screen that has one or more action buttons.

Figure 15:
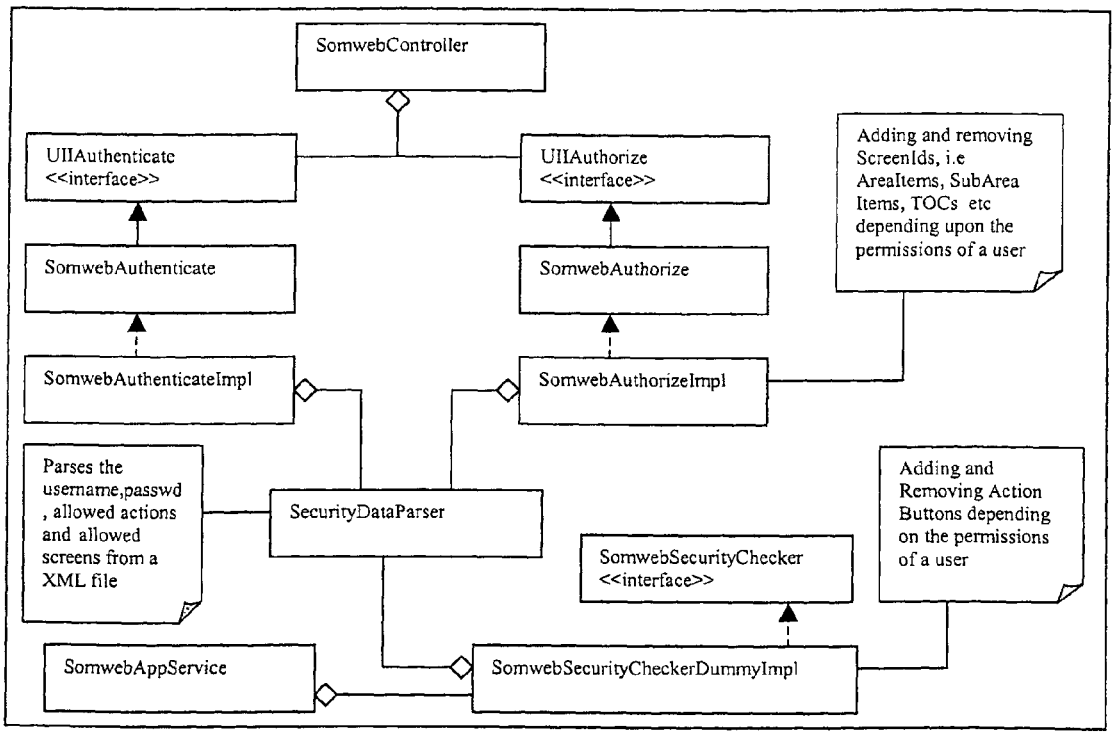
FIG. 15 is a class diagram showing security classes.

As an example, FIG. 15 is a class diagram for security classes that may be used in an implementation.

4.0 Implementation Mechanisms

Hardware Overview

Figure 19:
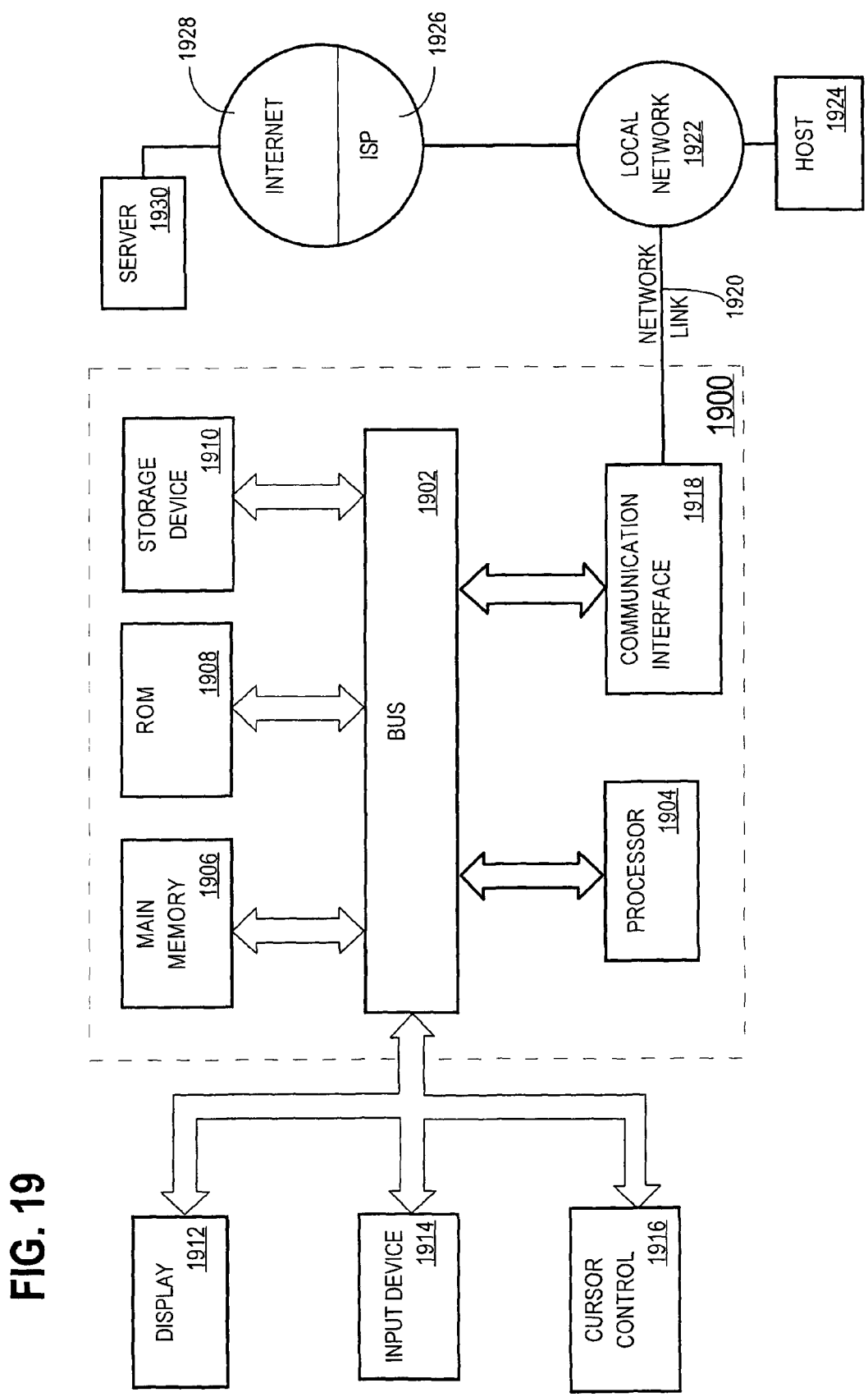
FIG. 19 is a block diagram that illustrates a computer system upon which an embodiment may be implemented.

FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory ("RAM") or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory ("ROM") 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube ("CRT"), for displaying information to a computer user. An input device 1914, including alphanumeric and other keys, is coupled to bus 1902 for communicating information and command selections to processor 1904. Another type of user input device is cursor control 1916, such as a mouse, trackball, stylus, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for generating consistent user interfaces. According to one embodiment of the invention, generating consistent user interfaces is provided by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infrared transmitter to convert the data to an infrared signal. An infrared detector can receive the data carried in the infrared signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network ("ISDN") card or a modem to provide a data communication connection to a corresponding type of telephone line. As another example, communication interface 1918 may be a local area network ("LAN") card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider ("ISP") 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. In accordance with the invention, one such downloaded application provides for generating consistent user interfaces as described herein.

The received code may be executed by processor 1904 as it is received, and/or stored in storage device 1910, or other non-volatile storage for later execution. In this manner, computer system 1900 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX 1

EXAMPLE SITEMAP XML FILE

```
 1  <? xml version="1.0" encoding="ISO-8859-1"?>
 2
 3  <!DOCTYPE appTypes SYSTEM "./appTypes.dtd>
 4
 5  <!--
 6  Configuration file for User Interface.
 7  -->
 8
 9  <appTypes>
10    <cee>
11      <banner>
12        <label>Example Screen Layout</label>
13        <image fileRef="./ciscoLogo.gif"/>
14      </banner>
15
16      <toolBar>
17        <toolBarItem>
18          <label>Logout</label>
19          <navContentArea screenID="Logout" fileRef="login.jsp"/>
20        </toolBarItem>
21      </toolBar>
22
23      <area>
24        <areaItem>
25          <label>Area Item</label>
26          <subArea>
27            <subAreaItem>
28              <label>Sub Area 1</label>
29              <TOC>
30                <TOCItem>
31                  <label>RPM-FRSM Connect</label>
32                  <navContentArea
33                    screenID="RPM _ FRSM_ Connect"
34                    contentAreaTitle="RPM_FRSM_Connect"
35                    fileRef="listPane.jsp"/>
36                </TOCItem>
37              </TOC>
38              <navContentArea
39                screenID="SubArea1"
```

APPENDIX 1-continued

EXAMPLE SITEMAP XML FILE

```
40      contentAreaTitle="Sub Area 1"
41      fileRef="SubArea1.jsp">
42      <tasks>
43        <taskID id="subarea1"/>
44      </tasks>
45    </navContentArea>
46  </subAreaItem>
47
48  <subAreaItem>
49    <label>Sub Area 2</label>
50    <TOC>
51      <TOCItem>
52        <label>RPM-FRSM Connect</label>
53        <navContentArea
54          screenID="RPM_FRSM_Connect1"
55          contentAreaTitle="RPM_FRSM_Connect"
56          fileRef="listPane.jsp"/>
57      </TOCItem>
58    </TOC>
59    <navContentArea
60      screenID="SubArea2"
61      contentAreaTitle="Sub Area 2"
62      fileRef="SubArea2.jsp">
63      <tasks>
64        <taskID id="subarea2"/>
65      </tasks>
66    </navContentArea>
67  </subAreaItem>
68      </subArea>
69    </areaItem>
70  </area>
71  </cee>
72  <monitoring/>
73 </appTypes>
```

APPENDIX 2

EXAMPLE STRUTS CONFIGURATION FILE

```
1  <?xml version="1.0" encoding="ISO-8859-1" ?>
2
3  <!DOCTYPE struts-config PUBLIC
4    "-//Apache Software Foundation//DTD Struts Configuration 1.0//EN"
5      "http://jakarta.apache.org/struts/dtds/struts-config_1_0.dtd">
6  <struts-config>
7
8    <form-beans>
9      <form-bean name="loginForm"
10         type="com.cisco.vnm.common.somweb.beans.SomwebLoginForm"/>
11    </form-beans>
12
13  <global-forwards>
14
15    <forward name="home" path="/index.jsp" />
16
17    <!-- These global forwards enable Action classes to forward the user
18       to any page which is accessble from the MI navigational
19       links; ( links in AreaBar, SubAreaBar, TOC and SubTOC ) -->
20    <!-- Example global forward for a screenid
21    <forward name="s004" path="/index.jsp?sid=s004"/>
22    -->
23    <forward name="Logout" path="/index.jsp?sid=Logout&newObjType=Logout" />
24
25
26    <forward name="RPM_FRSM_Connect"
27        path="/index.jsp?sid=RPM_FRSM_Connect&newObjType=RPM_FRSM_Connect" />
28    <forward name="SubArea1" path="/index.jsp?sid=SubArea1" />
29    <forward name="SubArea2" path="/index.jsp?sid=SubArea2" />
30
31
32  </global-forwards>
33
34  <action-mappings>
35    <action path="/login"
36        type="com.cisco.vnm.common.somweb.actions.SomwebLoginAction"
37        name="loginForm">
38      <forward name="success"
39        path="/index.jsp?sid=RPM_FRSM_Connect&newObjType=RPM_FRSM_Connect" />
40      <forward name="failure" path="/login.jsp" />
41    </action>
42
43    <action path="/Logout"
44        type="com.cisco.vnm.common.somweb.actions.SomwebLogoffAction">
45      <forward name="success" path="/login.jsp"/>
46    </action>
47
48    <action path="/SomwebServices"
49        type="com.cisco.vnm.conunon.somweb.actions.SomwebServicesAction">
50      <forward name="init" path="SvcObjForward/initPane.jsp"/>
51      <forward name="list" path="SvcObjForward/listPane.jsp"/>
```

APPENDIX 2-continued

EXAMPLE STRUTS CONFIGURATION FILE

```
52      <forward name="add" path="SvcObjForward/basicPane.jsp"/>
53      <forward name="modify" path="SvcObjForward/basicPane.jsp">
54      <forward name="delete" path="SvcObjForward/basicPane.jsp"/>
55      <forward name="details" path="/detailsPane.jsp"/>
56      <forward name="view" path="SvcObjForward/basicPane.jsp"/>
57      <forward name="failed" path="/login.jsp"/>
58      <forward name="initfailed" path="SvcObjForward/listPane.jsp"/>
59      <forward name="addfailed" path="SvcObjForward/basicPane.jsp"/>
60      <forward name="modifyfailed" path="SvcObjForward/basicPane.jsp"/>
61      <forward name="viewfailed" path="SvcObjForvvard/listPane.jsp"/>
62      <forward name="deletefailed" path="SvcObjForward/listPane.jsp"/>
63      <forward name="nextfailed" path="SvcObjForwarcl/initPane.jsp"/>
64      <forward name="customfinish" path="/customPane.jsp?finish=yes"/>
65      <forward name="custominit" path="/customPane.jsp"/>
66      <forward name="cancel" path="SvcObjForward/controlPane.jsp"/>
67    </action>
68    <action path="/browse"
69         type="com.cisco.vnm.common.somweb.actions.SomwebBrowseAction">
70      <forward name="tree" path="/treePanel.jsp"/>
71      <forward name="failed" path="/login.jsp"/>
72    </action>
73  <action path="/listselect"
74         type="com.cisco.vnm.common.somweb.actions.SomwebListSelector">
75      <forward name="list" path="/listSelector.jsp"/>
76      <forward name="failed" path="/login.jsp"/>
77    </action>
78
79    <action path="/RPM_FRSM_Connect" type="com.cisco.nm.uii.forwardToScreenIDV>
80    <action path="/SubArea1" type="com.cisco.nm.uii.forwardToScreenID"/>
81    <action path="/SubArea2" type="com.cisco.nm.uii.forwardToScreenID"/>
82
83
84    <!-- THE FOLLOWING ACTION IS USED BY UII "internally", DO NOT REMOVE -->
85    <action path="/openLevel" type="com.cisco.nm.uii.openLevelCornerCase"/>
86
87    <!-- THE FOLLOWING ACTION IS USED BY UII "internally", DO NOT REMOVE -->
88    <action path="/openLevel" type="com.cisco.nm.uii.openLevelCornerCase"/>
89
90    <!-- The standard administrative actions available with Struts -->
91    <!-- These would be either omitted or protected by security -->
92    <!-- in a real application deployment -->
93    <action path="/admin/addFormBean"
94         type="org.apache.struts.actions.AddFormBeanAction"/>
95    <action path="/admin/addForward"
96         type="org.apache.struts.actions.AddForwardAction"/>
97    <action path="/admin/addMapping"
98         type="org.apache.struts.actions.AddMappingAction"/>
99    <action path="/admin/reload"
100        type="org.apache.struts.actions.ReloadAction"/>
101   <action path="/admin/removeFormBean"
102        type="org.apache.struts.actions.RemoveFormBeanAction"/>
103   <action path="/admin/removeForward"
104        type="org.apache.struts.actions.RemoveForwardAction"/>
105   <action path="/admin/removeMapping"
106        type="org.apache.struts.actions.RemoveMappingAction"/>
107
108  <action-mappings>
109
110  </struts-config>
```

APPENDIX 3

EXAMPLE METADATA DEFINITIONS IN XML

```
 1 <morMeta>
 2 <packageDef name="CrossConnect">
 3
 4  <objectDef name="RPM_FRSM_Connect"
 5      label="RPM-FRSM Connect"
 6      namingAttribute="rpmFrsmConnId"
 7
 8 browser="com.cisco.vnm.common.somweb.example.CmRPM_FRSM_ConnectBrowser"
 9 iterator="com.cisco.vnrn.common.somweb.example.CmRPM_FRSM_Connect$Iterator"
10 cursor="com.cisco.vnm.common.somweb.example.CmRPM_FRSM_Connect$Cursor"
```

APPENDIX 3-continued

EXAMPLE METADATA DEFINITIONS IN XML

```
11   handler="com.cisco.vnm.common.somweb.example.CmRPM_FRSM_Connect$Handler"
12   >
13     <!-- Initial Parameters -->
14     <initParamDef name="virtualTemplate"
15       label="Virtual Template"
16       datatype="string"
17       groupName="initial"
18       toolTip="Select a RPM Template or type in RPM Template"
19     >
20     </initParamDef>
21     <initParamDef name="fromRPM"
22       label="From RPM"
23       datatype="string"
24       groupName="initial"
25       mandatory="true"
26       toolTip="Select a RPM"
27     >
28     </initParamDef>
29     <initParamDef name="toFrsm"
30       label="To FRSM"
31       datatype="string"
32       groupName="initial"
33       mandatory="true"
34       toolTip="Select a FRSM"
35     >
36     </initParamDef>
37     <paramGroupDef name="general" label="General"
38         wizardText="general parameters"/>
39     <paramGroupDef name="rpm" label="RPM"
40         wizardText="general parameters"/>
41     <paramGroupDef name="frsm" label="FRSM"
42         wizardText="general parameters"/>
43
44     <initParamDef name="downloadConnection"
45       label="Download Connection"
46       datatype="string"
47       groupName="initial"
48       access="create_rw, modify_rw"
49     >
50     </initParamDef>
51
52     <initParamDef name="downloadTransfer"
53       label="Download Transfer"
54       datatype="string"
55       groupName="general"
56       access="create_rw, modify_rw"
57     >
58     </initParamDef>
59     <initParamDef name="connectionType"
60       label="Connection Type"
61       datatype="string"
62       groupName="initial"
63       access="create_rw, modify_rw"
64     >
65     </initParamDef>
66     <paramDef name="description"
67       label="Description"
68       datatype="string"
69       screen="basic"
70       groupName="rpm"
71       subGroupName="RPM"
72       access="create_rw, modify_rw"
73     >
74     </paramDef>
75     <paramDef name="peakCellRate"
76       label="Peak Cell Rate"
77       datatype="int"
78       screen="basic"
79       groupName="rpm"
80       subGroupName="RPM"
81       access="create_rw, modify_rw"
82     >
83       <range min="1"max="155000"/>
84     <default><int value="1536"/></default>
85     </paramDef>
86     <paramDef name="sustainedCellRate"
87       label="Sustained Cell Rate"
```

APPENDIX 3-continued

EXAMPLE METADATA DEFINITIONS IN XML

```
88        datatype="int"
89        screen="basic"
90        groupName="rpm"
91        subGroupName="RPM"
92        access="create_rw, modify_rw"
93      >
94        <range min="1" max="155000"/>
95        <default><int value="1536"/></default>
96      </paramDef>
97      <paramDef name="maxBurstSize"
98        label="Max Burst Size"
99        datatype="int"
100       screen="basic"
101       groupName="rpm"
102       subGroupName="RPM"
103       access="create_rw, modify_rw"
104     >
105       <range min="1" max="65535"/>
106       <default><int value="1000"/></default>
107     </paramDef
108
109     <paramDef name="cacControl"
110       label="CAC Control"
111       datatype="int"
112       screen="basic"
113       groupName="frsm"
114       subGroupName="FRSM"
115       access="create_rw, modify_rw"
116     >
117       <range min="1" max="2"/>
118       <default><int value="1"/></default>
119     </paramDef>
120     <paramDef name="burstCommitted"
121       label="Burst Committed"
122       datatype="int"
123       screen="basic"
124       groupName="frsm"
125       subGroupName="FRSM"
126       access="create_rw, modify_rw"
127     >
128       <range min="0" max="65535"/>
129       <default><int value="5100"/></default>
130     </paramDef>
131     <paramDef name="burstExceeded"
132       label="Burst Exceeded"
133       datatype="int"
134       screen="basic"
135       groupName="frsm"
136       subGroupName="FRSM"
137       access="create_rw, modify_rw"
138     >
139       <range min="0" max="65535"/>
140       <default><int value="5100"/></default>
141     </paramDef>
142     <paramDef name="initBurstSize"
143       label="Initial Burst Size"
144       datatype="int"
145       screen="basic"
146       groupName="frsm"
147       subGroupName="FRSM"
148       access="create_rw, modify_rw"
149     >
150       <range min="0" max="65535"/>
151       <default><int value="5100"/></default>
152     </paramDef>
153     <!--
154     <paramDef name="deTagging"
155       label="DE Tagging"
156       datatype="enum"
157       screen="basic"
158       groupName="frsm"
159       subGroupName="FRSM"
160       access="create_rw, modify_rw"
161     >
162       <default><enum name="2" value="2"/></default>
163       <enumset>
164         <enum name="1" value="1"/>
```

APPENDIX 3-continued

EXAMPLE METADATA DEFINITIONS IN XML

```
165      <enum name="2" value="2"/>
166      </enumset>
167    </paramDef>
168
169    <paramDef name="egressRate"
170      label="Egress Rate"
171      datatype="int"
172      screen="basic"
173      groupName="frsm"
174      subGroupName="FRSM"
175      access="create_rw, modify_rw"
176      >
177      <range min="0" max="1536000"/>
178      <default><int value="1536000"/></default>
179    </paramDef>
180      -->
181
182  </objectDef>
183
184  </packageDef>
185  </morMeta>
```

APPENDIX 4

EXAMPLE SECURITY DATA DEFINITION

```
1    <SecurityData>
2      <SecData UserName="peterj" Password="peterj"
            AllowedScrIds="subarea1,subarea2"
3          AllowedActions="Add,View,Modify,Delete" />
4      <SecData UserName="jcpenn" Password="jcpenn"
            AllowedScrIds="subarea2"
5          AllowedActions="Add,Modify" />
6      <SecData UserName="yorkm" Password="yorkm"
            AllowedScrIds="subarea1"
7          AllowedActions="Add,Delete" />
8    </SecurityData>
```

What is claimed is:

1. A method comprising the computer-implemented steps of:

automatically generating a consistent user interface for an application program by assisting a user with building an hypertext markup language (HTML) user interface page by:

receiving one or more business objects that each define a user action for the application program;

receiving one or more metadata elements for dynamic content generation and defining parameters for the user actions of the one or more business object;

invoking a controller that is communicatively coupled to one or more actions, one or more widgets, and one or more panels;

receiving a first user request from the user through a browser used to interact with the application program and dispatching the user request to one or more of the actions;

based on a second user request received from the user through the browser, selecting a first panel from the one or more panels and including the first panel in the HTML user interface page;

wherein the first panel is dynamically generated using the one or more widgets and comprises a programmed template with a user-interface content;

wherein the user-interface content comprises one or more of user controls, programmable buttons and action buttons;

the controller determining which of the one or more actions is responsible for acting on the first user request;

obtaining, using the one or more actions, one or more parameter values from the business objects and dynamically manipulating the one or more parameter values;

using the one or more actions and the business object parameter values, selecting a first widget from the one or more widgets;

associating the first widget with the first panel selected from the one or more panels, wherein the selected first widget is arranged into a specified dynamic layout within the first panel; and generating the specified dynamic layout, at runtime, and presenting to the user, a user-interface utility comprising the HTML user interface page that includes the first widget arranged into the specified dynamic layout within the first panel; wherein he first widgets has the capability of representing properties of the business objects as HTML elements; wherein the method performed by one or more processors.

2. A method as recited in claim 1, wherein the business object parameters are associated with one of the widgets based on the user request.

3. A method as recited in claim 1, wherein the application program is a network management application program.

4. A method as recited in claim 1, wherein receiving one or more business objects that define functions of the application program comprises receiving an extensible markup language (XML) file that defines the business objects and one or more of the parameters for the business objects.

5. A method as recited in claim 1, further comprising the step of generating, using the widget, client-side executable program code that performs one or more data validation or access control operations on user input for the user operation.

6. A method as recited in claim 1, wherein the actions interact with the business objects through service object module interfaces that provide parameter values for the business objects to the actions.

7. A method as recited in claim 1, further comprising the steps of:
receiving user input in a field of the user interface that is associated with the widget, wherein the user input is received in HTML elements of an hypertext transfer protocol (HTTP) request from a browser;
converting the user input from the HTML elements into one or more programmatic objects having an appropriate data type for use by the application program.

8. A method as recited in claim 1, further comprising the step of associating a first widget with a second widget, wherein the first widget and second widget are related by a containment hierarchy.

9. A method as recited in claim 1, wherein each of the widgets represents one or more properties of the business objects by an HTML element.

10. A method as recited in claim 1, wherein the step of generating an HTML user interface page that includes the panel further comprises generating an HTML user interface page that includes one or more of java server pages (JSP) files, static HTML elements, style sheets, or images.

11. A computer-readable volatile or non-volatile storage medium storing one or more sequences of instructions which when executed by one or more processors, cause the one or more processors to perform the steps of:
automatically generating a consistent user interface for an application program by assisting a user with building an hypertext markup language (HTML) user interface page by:
receiving one or more business objects that each define a user action for the application program;
receiving one or more metadata elements for dynamic content generation and defining parameters for the user actions of the one or more business object;
invoking a controller that is communicatively coupled to one or more actions, one or more widgets, and one or more panels;
receiving a first user request from the user through a browser used to interact with the application program and dispatching the user request to one or more of the actions;
wherein the first panel is dynamically generated using the one or more widgets and comprises a programmed template with a user-interface content;
wherein the user-interface content comprises one or more of user controls, programmable buttons and action buttons;
based on a second user request received from the user through the browser, selecting a first panel from the one or more panels and including the first panel in the HTML user interface page;
the controller determining which of the one or more actions is responsible for acting on the first user request;
obtaining, using the one or more actions, one or more parameter values from the business objects and dynamically manipulating the one or more parameter values;
using the one or more actions and the business object parameter values, selecting a first widget from the one or more widgets;
associating the first widget with the first panel selected from the one or more panels, wherein the first widget is arranged into a specified dynamic layout within the first panel; and
generating the specified dynamic layout, at runtime, and presenting to the user, a user-interface utility comprising the HTML user interface page that includes the first widget arranged into the specified dynamic layout within the first panel; wherein the first widget has the capability of representing properties of the business objects as HTML elements.

12. A computer-readable volatile or non-volatile storage medium as recited in claim 11, wherein the business object parameters are associated with one of the widgets based on the user request.

13. A computer-readable volatile or non-volatile storage medium as recited in claim 11, wherein the application program is a network management application program.

14. A computer-readable volatile or non-volatile storage medium as recited in claim 11, wherein receiving one or more business objects that define functions of the application program comprises receiving an extensible markup language (XML) file that defines the business objects and one or more of the parameters for the business objects.

15. A computer-readable volatile or non-volatile storage medium as recited in claim 11, further comprising instructions for performing the step of generating, using the widget, client-side executable program code that performs one or more data validation or access control operations on user input for the user operation.

16. A computer-readable volatile or non-volatile storage medium as recited in claim 11, wherein the actions interact with the business objects through service object module interfaces that provide parameter values for the business objects to the actions.

17. A computer-readable volatile or non-volatile storage medium as recited in claim 11, further comprising instructions for performing the steps of:
receiving user input in a field of the user interface that is associated with the widget,
wherein the user input is received in HTML elements of an hypertext transfer protocol (HTTP) request from a browser; converting the user input from the HTML elements into one or more programmatic objects having an appropriate data type for use by the application program.

18. A computer-readable volatile or non-volatile storage medium as recited in claim 11, further comprising instructions for performing the step of associating a first widget with a second widget, wherein the first widget and second widget are related by a containment hierarchy.

19. A computer-readable volatile or non-volatile storage medium as recited in claim 11, wherein each of the widgets represents one or more properties of the business objects by an HTML element.

20. A computer-readable volatile or non-volatile storage medium as recited in claim 11, wherein the step of generating an HTML user interface page that includes the panel further comprises generating an HTML user interface page that includes one or more of java server pages (JSP) files, static HTML elements, style sheets, or images.

21. An apparatus comprising: one or more processors;
means for automatically generating a consistent user interface for an application program by assisting a user with building an hypertext markup language (HTML) user interface page, the means including:
means for receiving one or more business objects that each define a user action for the application program;
means for receiving one or more metadata elements for dynamic content generation and defining parameters for the user actions of the one or more business object;
means for invoking a controller that is communicatively coupled to one or more actions, one or more widgets, and one or more panels;

means for receiving a first user request from the user through a browser used to interact with the application program and dispatching the user request to one or more of the actions, wherein the controller determines which of the one or more actions is responsible for acting on the user request;

means for selecting, based on a second user request received from the user through the browser, a first panel from the one or more panels and including the first panel in the HTML user interface page;

wherein the first panel is dynamically generated using the one or more widgets and comprises a programmed template with a user-interface content;

wherein the user-interface content comprises one or more of user controls, programmable buttons and action buttons;

means for obtaining, using the one or more actions, one or more parameter values from the business objects and dynamically manipulating the one or more parameter values;

means for selecting a first widget from the one or more widgets, using the one or more actions and the business object parameter values;

means for associating the first widget with the first panel selected from the one or more panels, wherein the first widget is arranged into a specified dynamic layout within the first panel; and means for generating the specified dynamic layout, at runtime, and presenting to the user, a user-interface utility comprising the HTML user interface page that includes the first widget arranged into the specified dynamic layout with in the first panel;

wherein the first widget has the capability of representing properties of the business objects as HTML elements.

22. An apparatus as recited in claim 21, wherein the business object parameters are associated with one of the widgets based on the user request.

23. An apparatus as recited in claim 21, wherein the application program is a network management application program.

24. An apparatus as recited in claim 21, wherein the means for receiving one or more business objects that define functions of the application program comprises means for receiving an extensible markup language (XML) file that defines the business objects and one or more of the parameters for the business objects.

25. An apparatus as recited in claim 21, further comprising means for generating, using the widget, client-side executable program code that performs one or more data validation or access control operations on user input for the user operation.

26. An apparatus as recited in claim 21, wherein the actions interact with the business objects through service object module interfaces that provide parameter values for the business objects to the actions.

27. An apparatus as recited in claim 21, further comprising:
means for receiving user input in a field of the user interface that is associated with the widget, wherein the user input is received in HTML elements of an hypertext transfer protocol (HTTP) request from a browser; means for converting the user input from the HTML elements into one or more programmatic objects having an appropriate data type for use by the application program.

28. An apparatus as recited in claim 21, further comprising means for associating a first widget with a second widget, wherein the first widget and second widget are related by a containment hierarchy.

29. An apparatus as recited in claim 21, wherein each of the widgets represents one or more properties of the business objects by an HTML element.

30. An apparatus as recited in claim 21, wherein the means for generating an HTML user interface page that includes the panel further comprises means for generating an HTML user interface page that includes one or more of java server pages (JSP) files, static HTML elements, style sheets, or images.

31. An apparatus comprising:
a network interface that is coupled to the data network for receiving one or more packet flows therefrom;
a processor;
one or more stored sequences of instructions which, when executed by the processor, cause the processor to perform the steps of:
automatically generating a consistent user interface for an application program by assisting a user with building an hypertext markup language (HTML) user interface page by:
receiving one or more business objects that each define a user action for the application program;
receiving one or more metadata elements for dynamic content generation and defining parameters for the user actions of the one or more business object;
invoking a controller that is communicatively coupled to one or more actions, one or more widgets, and one or more panels;
receiving a first user request from the user through a browser used to interact with the application program and dispatching the user request to one or more of the actions;
based on a second user request received from the user through the browser, selecting a first panel from the one or more panels and including the first panel in the HTML user interface page;
wherein the first panel is dynamically generated using the one or more widgets and comprises a programmed template with a user-interface content;
wherein the user-interface content comprises one or more of user controls, programmable buttons and action buttons:
the controller determining which of the one or more actions is responsible for acting on the first user request;
obtaining, using the one or more actions, one or more parameter values from the business objects and dynamically manipulating the one or more parameter values;
using the one or more actions and the business object parameter values, selecting a first widget from the one or more widgets;
associating the first widget with the first panel selected from the one or more panels, wherein the first widget is arranged into a specified dynamic layout within the first panel; and
generating the specified dynamic layout, at runtime, and presenting to the user, a user-interface utility comprising the HTML user interface page that includes the first widget arranged into the specified dynamic layout within the first panel; wherein the first widget has the capability of representing properties of the business objects as HTML elements.

32. An apparatus as recited in claim 31, wherein the business object parameters are associated with one of the widgets based on the user request.

33. An apparatus as recited in claim 31, wherein the application program is a network management application program.

34. An apparatus as recited in claim 31, wherein receiving one or more business objects that define functions of the application program comprises receiving an extensible markup language (XML) file that defines the business objects and one or more of the parameters for the business objects.

35. An apparatus as recited in claim 31, further comprising instructions for performing the step of generating, using the widget, client-side executable program code that performs one or more data validation or access control operations on user input for the user operation.

36. An apparatus as recited in claim 31, wherein the actions interact with the business objects through service object module interfaces that provide parameter values for the business objects to the actions.

37. An apparatus as recited in claim 31, further comprising instructions for performing the steps of: receiving user input in a field of the user interface that is associated with the widget, wherein the user input is received in HTML elements of an hypertext transfer protocol (HTTP) request from a browser; converting the user input from the HTML elements into one or more programmatic objects having an appropriate data type for use by the application program.

38. An apparatus as recited in claim 31, further comprising instructions for performing the step of associating a first widget with a second widget, wherein the first widget and second widget are related by a containment hierarchy.

39. An apparatus as recited in claim 31, wherein each of the widgets represents one or more properties of the business objects by an HTML element.

40. An apparatus as recited in claim 31, wherein the instructions for performing the step of generating an HTML user interface page that includes the panel further comprises generating an HTML user interface page that includes one or more of JSP files, static HTML elements, style sheets, or images.

* * * * *

UNITED STATES PATENT AND TRADEMARK OFFICE
CERTIFICATE OF CORRECTION

PATENT NO. : 7,873,908 B1  
APPLICATION NO. : 10/676718  
DATED : January 18, 2011  
INVENTOR(S) : Sankara Varanasi et al.

Page 1 of 1

It is certified that error appears in the above-identified patent and that said Letters Patent is hereby corrected as shown below:

Claim 1, Column 30, Line 13, delete "selected"

Claim 1, Column 30, Line 20, replace "he" with --the-- and replace "widgets" with --widget--

Signed and Sealed this  
Twenty-second Day of March, 2011

David J. Kappos  
*Director of the United States Patent and Trademark Office*